(12) United States Patent
Lee et al.

(10) Patent No.: US 8,189,556 B2
(45) Date of Patent: *May 29, 2012

(54) PACKET TRANSMITTING METHOD IN MOBILE COMMUNICATION SYSTEM

(75) Inventors: Young Jo Lee, Seoul-si (KR); Soon Yil Kwon, Gunpo-si (KR); Ki Jun Kim, Seoul-si (KR); Young Woo Yun, Seoul-si (KR); Suk Hyon Yoon, Seoul-si (KR)

(73) Assignee: LG Electronics Inc., Seoul (KR)

( * ) Notice: Subject to any disclaimer, the term of this patent is extended or adjusted under 35 U.S.C. 154(b) by 699 days.

This patent is subject to a terminal disclaimer.

(21) Appl. No.: 10/856,573

(22) Filed: May 28, 2004

(65) Prior Publication Data

US 2005/0058154 A1    Mar. 17, 2005

Related U.S. Application Data

(63) Continuation-in-part of application No. 10/101,220, filed on Mar. 20, 2002, now Pat. No. 7,580,427.

(60) Provisional application No. 60/515,381, filed on Oct. 30, 2003.

(30) Foreign Application Priority Data

Mar. 21, 2001  (KR) .................. 10-2001-0014696
Sep. 10, 2001  (KR) .................. 10-2001-0055538
May 30, 2003  (KR) .................. 10-2003-0034945

(51) Int. Cl.
*H04J 3/24*    (2006.01)
*H04W 4/00*    (2009.01)
*H04B 7/216*   (2006.01)
*H04J 3/08*    (2006.01)

(52) U.S. Cl. ........ 370/349; 370/326; 370/328; 370/338; 370/342; 370/473

(58) Field of Classification Search .............. 370/473, 370/349, 326, 338, 342, 328, 329
See application file for complete search history.

(56) References Cited

U.S. PATENT DOCUMENTS

| | | |
|---|---|---|
| 6,084,904 A | 7/2000 | Wang et al. |
| 6,212,659 B1 | 4/2001 | Zehavi |
| 6,367,045 B1 | 4/2002 | Khan et al. |

(Continued)

FOREIGN PATENT DOCUMENTS

JP    2001-217771    8/2001

(Continued)

*Primary Examiner* — George Eng
*Assistant Examiner* — Muthuswamy Manoharan
(74) *Attorney, Agent, or Firm* — McKenna Long & Aldridge LLP

(57) ABSTRACT

Disclosed in a mobile communication system, and more particularly a method of re-transmitting data through a reverse link in a packet data system using ARQ (automatic repeat request) and a packet transmitting method and apparatus by which transmission efficiency is enhanced. The present invention discloses a method for re-transmitting data through a reverse link in Packet Data communication system using automatic repeat request (ARQ) adjusting data retransmission energy to be reduced at a predetermined ratio of one receiving energy for an initial data transmission to other receiving energy for a data re-transmission. The present invention also discloses a hybrid automatic repeat request system for packet transmission in which separate traffic-to-pilot power ratios are assigned to sub-packets when transmitting the sub-packets formed from one packet.

9 Claims, 22 Drawing Sheets

U.S. PATENT DOCUMENTS

| | | |
|---|---|---|
| 6,385,184 B2 | 5/2002 | Kitade et al. |
| 6,977,888 B1 | 12/2005 | Frenger et al. |
| 7,072,307 B2 | 7/2006 | Tong et al. |
| 7,200,789 B2 * | 4/2007 | Kim et al. ............ 714/748 |
| 7,310,340 B2 * | 12/2007 | Seidel et al. .......... 370/394 |
| 2001/0034209 A1 | 10/2001 | Tong et al. |
| 2002/0046379 A1 * | 4/2002 | Miki et al. ............ 714/749 |
| 2003/0133408 A1 * | 7/2003 | Cheng et al. .......... 370/230 |
| 2003/0235160 A1 * | 12/2003 | Saifuddin ............. 370/326 |
| 2004/0162083 A1 * | 8/2004 | Chen et al. ............ 455/454 |
| 2005/0128964 A1 | 6/2005 | Tiedemann, Jr. et al. |
| 2005/0135320 A1 * | 6/2005 | Tiedemann et al. ...... 370/338 |
| 2005/0190718 A1 * | 9/2005 | Holtzman et al. ........ 370/328 |

FOREIGN PATENT DOCUMENTS

| | | |
|---|---|---|
| KR | 1019990086015 | 2/2001 |
| KR | 1020010031941 | 4/2001 |
| KR | 1020020074739 | 10/2002 |
| KR | 1020020081529 | 10/2002 |
| WO | 99/26371 | 5/1999 |
| WO | WO 99/26371 | 5/1999 |
| WO | WO 00/19634 | 4/2000 |

\* cited by examiner

FIG. 10
R-NPDCH
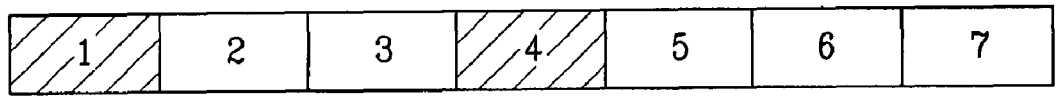
R-RPDCH
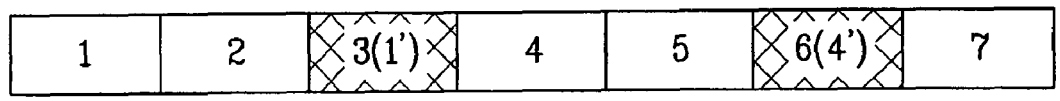
 "NACK" generated frame in R-NPDCH
 retransmission frame in R-RPDCH

PACKET TRANSMITTING METHOD IN MOBILE COMMUNICATION SYSTEM

CROSS-REFERENCE TO RELATED APPLICATIONS

This application is a continuation-in-part of pending U.S. patent application Ser. No. 10/101,220, entitled METHOD FOR RETRANSMITTING DATA THROUGH A REVERSE LINK IN PACKET DATA COMMUNICATION SYSTEM USING AUTOMATIC REPEAT REQUEST, filed on Mar. 20, 2002 now U.S. Pat. No. 7,580,427.

This application claims the benefit of Korean Application Nos. P2001-14696, filed on Mar. 21, 2001, P2001-55538, filed on Sep. 10, 2001, and P2003-34945, filed on May 30, 2003, which are hereby incorporated by reference herein in their entirety.

This application also claims the benefit of U.S. Provisional Application Ser. No. 60/515,381 filed on Oct. 30, 2003, the contents of which is hereby incorporated by reference herein in its entirety.

BACKGROUND OF THE INVENTION

1. Field of the Invention

The present invention relates to a mobile communication system, and more particularly, to a method of re-transmitting data through a reverse link in a packet data system using ARQ (automatic repeat request) as well as a method and apparatus for transmitting a packet efficiently using sub-packets in a mobile communication system that adopts the HARQ (hybrid auto retransmission request) system in packet transmission.

2. Description of the Related Art

Generally, 1x DO (data only) is a mobile communication technique enhancing data transmission rate over 2 Mbps from cdma2000-1x called the 2.5 generation mobile communication. On the contrary, 1x-EV DV is a service system realizing a data transmission rate of 2.about.3 Mbps in a mobile section as well as supporting a voice service.

Namely, 1x-EV DV is a general term for the standardization enabling to support a high-speed packet data service as well as the previous voice service based on 1x technology of synchronous cdma2000 RTT.

Compared to the previous 1x RTT technology, 1x-EV DV accepts an adaptive modulation & coding (hereinafter abbreviated AMC) technique and an HARQ system in a forward link. Yet, for a reverse link, channel addition to support the AMC technology and HARQ system is just made thereto.

Generally, link adaptation includes power control and rate control.

In the rate control, a receiving end adjusts a rate of a transmission terminal through power variation of a received signal, for which a power level of the signal received by the receiving end should fluctuate.

Yet, an objective of the power control is to control to lead a level of power, which is received by the receiving end, into a level in which modulation and coding techniques used by the current radio operate at a demanded level. Hence, it is difficult to use both of the power control and the AMC technique simultaneously.

The power control settles a near-far problem occurring at a reverse link. An objective of the power control is to adjust power levels of all terminals received by a base transceiver system into a predetermined level by differing transmission powers of the terminal far from the base transceiver system to the terminal near to the base transceiver system.

Compared to the forward link, the reverse link has the near-far problem in general so as to need the power control absolutely. Therefore, it is difficult to apply the same AMC technique of the forward link thereto.

Meanwhile, the HARQ system combines HARQ (automatic repeat request) through error detection with the previous forward error restoration coding system.

Generally, there are three kinds of the HARQ systems, Type-I of the HAFQ system, then an error occurs at the first transmission, retransmits the same information so that a receiving side uses a chase combining form.

Type-II and type-III of the HARQ systems increase redundancy in the respective transmissions. A receiving side combines code of the first transmission signal with of that of retransmission signal so as to reduce a code rate. Namely, compared to the type-I of the HARQ system, type-II and type-III of the HARQ systems attain coding gains, respectively.

In this case, a classification between type-II and type-III of the HARQ systems is made in a following manner. The type-II is taken if each of the transmission information fails to be self-decodable. Andy the type-III is taken if each of the transmission information is self-decodable.

There exists dissimilarity between the forward and reverse link channels. Such dissimilarity makes it difficult to apply the technologies of increasing data throughput in the previous forward link to the reverse.

Generally, the HARQ system considered by the current reverse link takes care of the following items.

First, if a turbo code rate is ¼, a receiving end uses the type-I of HARQ and applies chase combining thereto.

Second, if the turbo code rate is ½, the receiving end uses both of the type-II and the type-III of HARQ so as to use the incremental redundancy.

The use of such systems is supported by the fact that a minimum code rate of the turbo code as an encoding system is ⅕.

The first system, when the turbo code of ¼ code rate is used, having already attained a sufficient coding gain, has no big difference of gain in using the incremental redundancy.

And, the second system enables to attain a big coding gain using the incremental redundancy when the code rate is ½.

There occur some problems in using the above-mentioned systems.

For reference, a redundancy code is a code that a redundant code series are added to the code series required for expressing original information in order to detect or amend errors occurring in the process of transmitting data, which is called "redundancy" in brief. When a packet having NACK is retransmitted it is called "incremental redundancy" that another redundancy having failed to be transmitted in the previous packet is transmitted.

First of all, as explained in the foregoing description, the power control is carried out so as to keep a predetermined level of quality by adjusting a level of receiving power in the reverse link.

Yet, when the chase combining of the first system is used, the retransmission consumes excessive energy amounting to that of the first transmission in result.

Namely, even though the packet error in the reverse, link can be settled mostly by adding little energy to the energy of the first transmission, a signal having the same energy of the first transmission signal is retransmitted so as to waste energy.

Moreover, when the receiving end executes the chase combining, it is unable to apply the dedicate data rate control for the reverse link traffic, which is currently being considered, to the packet to be retransmitted.

Therefore, a new link adaptation method is required in order to settle the problem of the first system as well as increase the advantageous coding gain of the second system.

FIG. 1 illustrates one packet constructed with a plurality of sub-packets. The sub-packet has a structure which is decodable with one sub-packet only (type III) and allows the determination of success or failure of the transmission.

Decoding is performed by combining the currently received sub-packets with the previously received sub-packets as well as determining the success or failure of the transmission. Because each sub-packet contains sufficient information to provide the packet data upon decoding, early termination of transmission may be brought about using the sub-packet format illustrated in FIG. 1. Early termination enables transmission of a data packet without transmitting all the sub-packets upon success of a sub-packet transmission.

A traffic-to-pilot power ratio (TPR) is a ratio of power allocated to a traffic channel versus power allocated to a pilot channel. The power allocated to the traffic channel is maintained at a predetermined ratio over the power allocated to the pilot channel to guarantee optimal performance of the traffic channel. The power allocation ratio between the traffic and pilot channels is the traffic-to-pilot power ratio (TPR).

In a conventional synchronous mobile communication network, the traffic-to-pilot power ratio is used in the reverse link. The traffic-to-pilot power ratio differs according to conditions such as the transmission rate of the traffic channel, coding scheme and transmission time. For example, when a voice signal is transmitted via a reverse fundamental channel (FCH) at 9,600 bps in the IS-95 system, the traffic-to-pilot power ratio is 3.75 dB, or the transmission power of the traffic channel is 3.75 dB higher than that of the pilot channel.

In the conventional art, when sub-packets are transmitted, the transmission power of all the sub-packets is maintained at a constant TPR. Therefore, the traffic-to-pilot power ratio is uniformly applied to all the sub-packets. For example, if there are four sub-packets and a traffic-to-pilot power ratio of a first sub-packet is 5 dB, the traffic-to-pilot power ratios of the second through fourth sub-packets are maintained at 5 dB. However, transmission efficiency is degraded when all the sub-packets are transmitted by applying the same traffic-to-pilot power ratio.

Therefore, there is a need for a method and apparatus for transmitting a packet efficiently using sub-packets in a mobile communication system.

SUMMARY OF THE INVENTION

Accordingly, the present invention is directed to a data transmission method that substantially obviates one or more problems due to limitations and disadvantages of the related art.

One object of the present invention is to provide a link adaptation method and system thereof using a hybrid automatic retransmission demand system in a reverse link so as to control effectively power and data rate in the reverse link.

Another object of the present invention is to provide a link adaptation method and system thereof enabling to prevent waste of transmission energy by controlling power of a retransmitted signal.

Another object of the present invention is to provide a packet transmitting method in a mobile communication system, by which transmission efficiency is enhanced by allocating separate power levels in transmitting the sub-packets that, respectively, are formed from a single packet.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve some objects and advantages and in accordance with the purpose of the invention, as embodied and broadly described herein, a method is provided for re-transmitting data through a reverse link in a Packet Data communication system using automatic repeat request (ARQ) that adjusts data retransmission energy to be reduced at a predetermined ratio of one receiving energy for an initial data transmission to other receiving energy for a data retransmission.

To achieve other objects and other advantages and in accordance with the purpose of the invention, as embodied and broadly described herein, the present invention is embodied in a mobile communication system using a hybrid automatic repeat request (HARQ) method for packet transmission that facilitates transmitting an encoded packet of data efficiently by forming sub-packets, each of which includes sufficient information to form the data packet when decoded, and separately determining a power ratio level for each sub-packet transmitted.

In one aspect of the present invention, a data retransmission method includes mapping a transmission energy corresponding to at least one data rate, allocating a portion of a transmission energy determined by a reverse data rate control to the retransmission data and the rest portion of the transmission energy to a new transmission data to be transmitted, and transmitting the retransmission and new transmission data so as to correspond to the respective allocated transmission energy.

In another aspect of the present invention, a data retransmission method includes updating an effective data rate in accordance with at least one data rate control command, comparing the updated effective data rate to a data rate when a retransmission data to be retransmitted is initially transmitted, determining a data rate of a new transmission data to be transmitted and a transmission energy of the retransmission data in accordance with the comparison result, and transmitting the new transmission data and the retransmission data to correspond to the determined data rate of the new transmission data and the determined transmission energy.

In another aspect of the present invention, a data retransmission method includes the steps of receiving whether a retransmission of a data previously transmitted is carried out or not through an independent physical channel or a common channel for a dedicate data rate controls mapping a transmission energy corresponding to at least one data rate, allocating a portion of the transmission energy determined by the data rate control to a retransmission data to be retransmitted and another portion of the transmission energy to a new transmission data to be transmitted, and transmitting the retransmission data and the new transmission data corresponding to the allocated transmission energies.

In another aspect of the present invention, a data transmission method using an Automatic Repeat request (ARQ) through a reverse link in a packet data communication system controls data retransmission energy to be reduced at a predetermined ratio of first transmission energy.

In another aspect of the present invention, a method is provided for transmitting a data packet from a transmitting entity to a receiving entity in a wireless communication system. The method includes re-configuring an encoded packet to be transmitted as three or more sub-packets, determining a power level to be applied to each of the sub-packets such that a first power level is assigned to a first sub-packet transmitted and second and third power levels lower than or equal to the first power level are assigned according to a transmission condition to, respectively, second and third sub-packets to be transmitted, selecting the next sub-packet to transmit at a determined power level and determining the success or failure of the sub-packet transmission of each of the sub-packets to sequentially transmit the sub-packets until acknowledgement response information (ACK) is received from the receiving entity.

Preferably sub-packets are transmitted in a reverse communication link and the acknowledgment response is received in a forward communication link. After transmitting a sub-packet, it is determined whether an acknowledgment response was received indicating that the sub-packet was correctly received. If the sub-packet was correctly received, no more sub-packets are transmitted. If the sub-packet was not correctly received, the next sequential sub-packet is transmitted at the assigned power level until all sub-packets have been transmitted.

It is contemplated that the power level determined for each sub-packet may be determined based on channel state and/or a system state. For example, a transmission data rate and a channel power level associated with the data rate may be utilized to determine the power level for each sub-packet, with the transmission data rate associated with an encoded packet size and different channel power levels associated with different transmission data rates. Preferably the sum of the power levels determined for each of the sub-packets is substantially equal to the power level associated with the data rate and each of the determined sub-packet power levels is associated with a traffic-to-pilot power ratio (TPR).

It is contemplated that the second power level may be greater than or equal to the third power level. It is further contemplated that at least the second power level may be equal to the first power level. In a preferred embodiment, the first power level is at least about 3 db greater than the second and third power levels. A fourth sub-packet may be formed, with the power level assigned to the fourth sub-packet less than the first power level.

In another aspect of the present invention, a method is provided for transmitting a data packet from a transmitting entity to a receiving entity in a wireless communication system. The method includes re-configuring an encoded packet to be transmitted as multiple sub-packets, determining a power level to be applied to each of the sub-packets such that a first power level is assigned to a first sub-packet transmitted and power levels lower than the first power level are assigned according to a transmission condition to the rest of the sub-packets to be transmitted, selecting the next sub-packet to transmit at a determined power level and determining the success or failure of the sub-packet transmission of each of the sub-packets to sequentially transmit the sub-packets until acknowledgement response information (ACK) is received from the receiving entity.

It is contemplated that a predetermined number of sub-packets may be formed from the packet to be transmitted. Preferably sub-packets are transmitted in a reverse communication link and the acknowledgment response is received in a forward communication link. After transmitting a sub-packet, it is determined whether an acknowledgment response was received indicating that the sub-packet was correctly received. If the sub-packet was correctly received, no more sub-packets are transmitted. If the sub-packet was not correctly received, the next sequential sub-packet is transmitted at the assigned power level until all sub-packets have been transmitted.

It is contemplated that the power level determined for each sub-packet may be determined based on channel state and/or a system state. For example, a transmission data rate and a channel power level associated with the data rate may be utilized to determine the power level for each sub-packet, with the transmission data rate associated with an encoded packet size and different channel power levels associated with different transmission data rates. Preferably the sum of the power levels determined for each of the sub-packets is substantially equal to the power level associated with the data rate and each of the determined sub-packet power levels is associated with a traffic-to-pilot power ratio (TPR).

It is contemplated that the power levels may be assigned to the sub-packets such that each sub-packet is assigned a power level that is less than or equal to the sequentially previous sub-packet. It is further contemplated that a predetermined number, for example three, of sub-packets may be formed from the data packet to be transmitted. In a preferred embodiment, the first power level is at least about 3 db greater than other power levels.

In another aspect of the present invention, a terminal is provided for radio communication with a network. The terminal includes a transmitter, a display, a memory unit, a receiver and a processing unit.

The transmitter transmits sub-packets to the network using assigned power levels. The display conveys information to a user. The memory unit stores information related to the data sub-packets and assigned power levels. The receiver receives an acknowledgment response from the network, the acknowledgment response indicating whether a transmitted sub-packet was correctly received. The processing unit performs the methods of the present invention to transmit an encoded packet to the network in the form of sub-packets having individually determined power levels.

In another aspect of the present invention, a network is provided for radio communication with a terminal. The network includes a transmitter, a receiver, a storage unit, and a controller.

The transmitter transmits sub-packets to the terminal using assigned power levels. The display conveys information to a user. The receiver receives an acknowledgment response from the terminal, the acknowledgment response indicating whether a transmitted sub-packet was correctly received. The storage unit stores information related to the data sub-packets and assigned power levels. The controller performs the methods of the present invention to transmit an encoded packet to the terminal in the form of sub-packets having individually determined power levels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same.

FIG. 10 illustrates diagrams of multiplexed R-NPDCH for an initial transmission and R-RPDCH for a retransmission according to the second embodiment of the present invention.

DETAILED DESCRIPTION OF THE PREFERRED EMBODIMENTS

Figure 1:
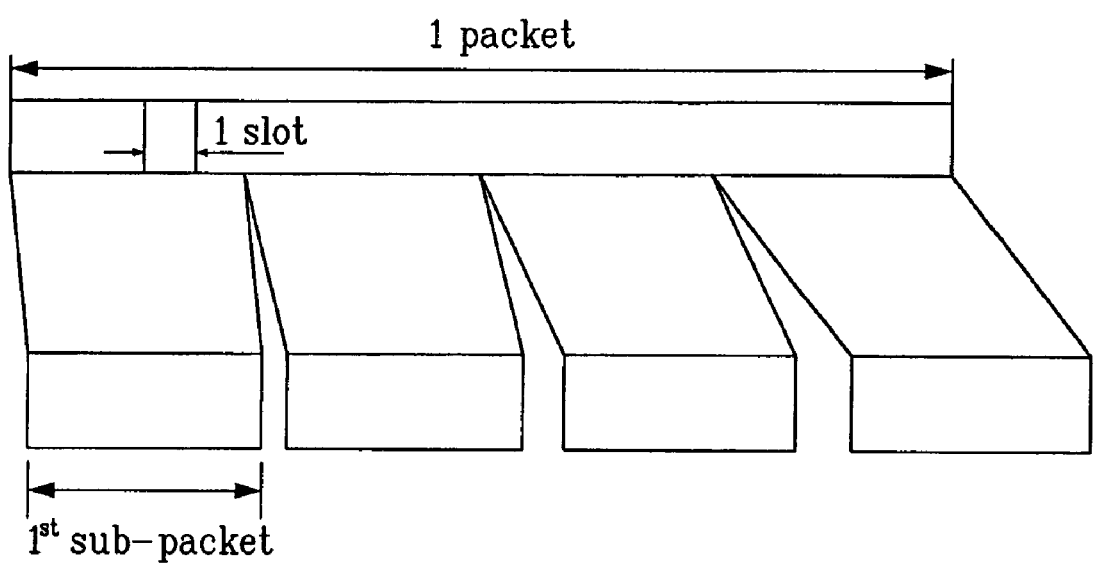
FIG. 1 is an exemplary diagram of one packet constructed with a plurality of sub-packets.

Reference will now be made in detail to the preferred embodiments of the present invention, examples of which are illustrated, in the accompanying drawings. Wherever possible, the same reference numbers will be used throughout the drawings to refer to the same or like parts.

The present invention proposes a method of combining a system of supporting HARQ effectively in a reverse link with a dedicate control system for a data rate of a reverse traffic.

First Embodiment

A first embodiment according to the present invention uses an incremental redundancy code in all cases of retransmission regardless of a code rate, whereby excessive energy consumption is prevented on retransmission.

Moreover, when there exist data to be retransmitted, transmission energy of the retransmitted data is adjusted so that the receiving energy of the data to be retransmitted will become a portion of the receiving energy when the retransmitted data are initially transmitted. For instance, the retransmission energy, which enables ¼ or ⅛ energy compared to the receiving energy to the initial transmission energy to be received by the retransmission data, is allocated to the retransmission for the use.

Besides, the energy to be used possibly in a packet to be transmitted may be determined in accordance with a data rate determined by a reverse link dedicate rate control. In this case, a portion of the currently usable energy allowed by the dedicate rate control except the other energy portion required for the retransmission is used as energy for data to be newly transmitted.

And, when NAK (non-acknowledgement) is transferred from a receiving end for a packet transmitted at the data rate determined by the reverse link dedicate rate control, a transmission end determines a data rate of the data to be retransmitted and another data rate of the data to be newly transmitted, and then multiplexes to transmit packets generated from these data rates.

In this case, the data rate of the data to be retransmitted is determined as a data rate at which the data, to be retransmitted is initially transmitted. And, the data rate of the data to be newly transmitted, as explained in the foregoing description, is properly adjusted in a manner that the transmission energy of the data to be retransmitted is controlled so that the receiving energy of the retransmitted data will become a predetermined % of the receiving energy at the initial transmission of the data to be retransmitted.

Methods of multiplexing a packet for the retransmission and a packet for the new transmission are mainly divided into code division multiplexing (hereinafter abbreviated CDM) and time division multiplexing (hereinafter abbreviated TDM).

First, a transmission end in a TDM system has a predetermined data rate in accordance with a reverse dedicate rate control, and generates a code symbol having a demanded interleaver length in accordance with the data rate. For this, a code symbol of the data to be newly transmitted and a code symbol of the data to be retransmitted are generated separately, and then the generated symbols are multiplexed in due time. Thereafter, a transmission system undergoes through a modulation process and a spreading process. In this case, the retransmission packet and the packets for new transmission use one common Walsh code and are transmitted through one common physical channel. Such a process is explained in detail as follows by referring to FIG. 2.

Figure 2:
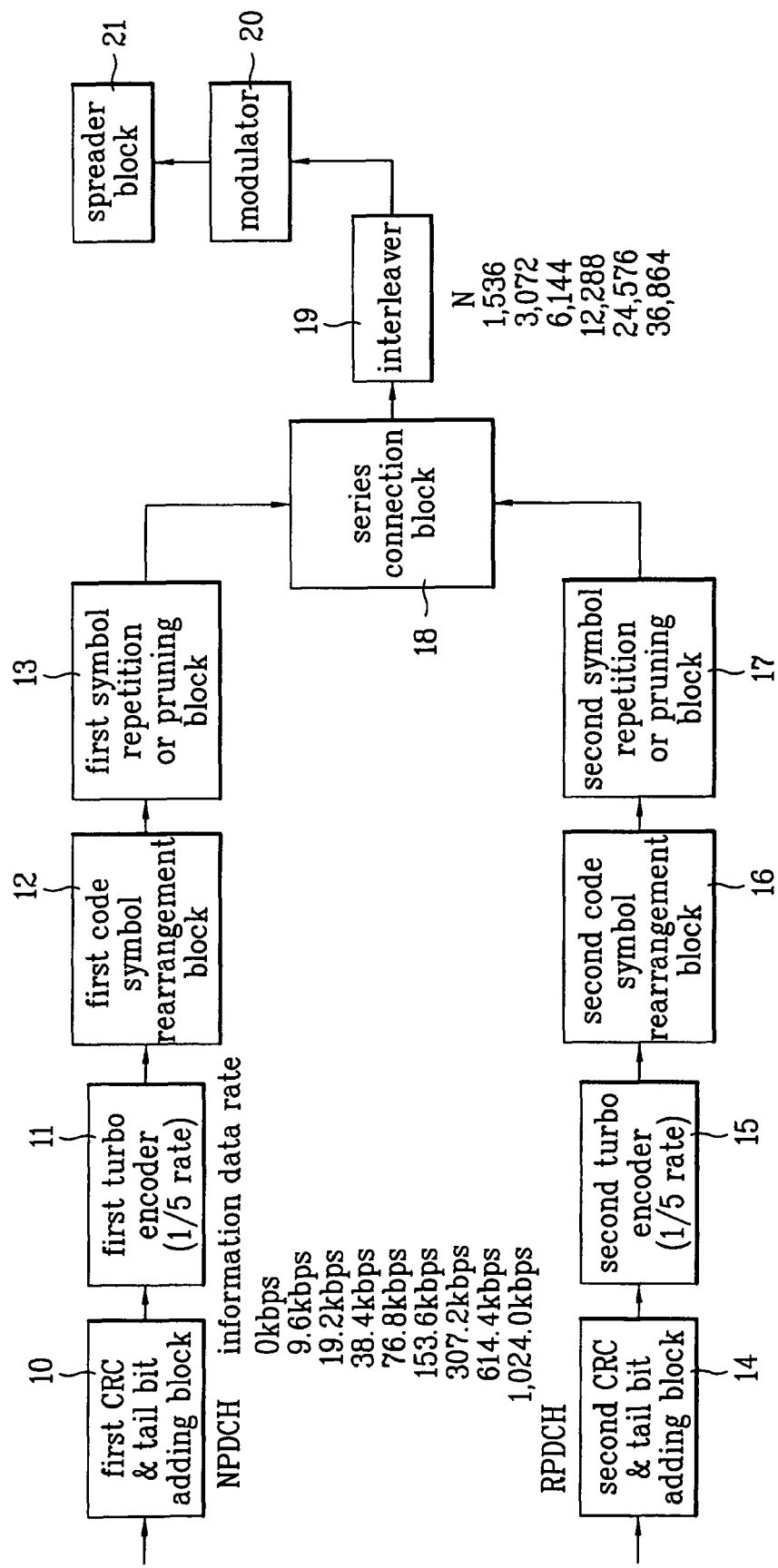
FIG. 2 illustrates a functional block diagram of generating a transmission signal using a TDrM system according to a first embodiment of the present invention.

FIG. 2 illustrates a functional block diagram of generating a transmission signal using a TDM system according to a first embodiment of the present invention, in which a count of retransmission for an error-occurring packet is limited to 1 by a transmission end.

Referring to FIG. 2, a system of generating a transmission signal using TDM according to the present invention includes CRC & tail bit adding blocks 10 and 14 adding CRC (cyclic redundancy code) for an error check and a tail bit to data, to be newly transmitted or data of the previously transmitted data to be retransmitted, turbo encoders 11 and 15 encoding outputs of the blocks 10 and 14 into turbo codes of ⅕ code rate, first and second symbol rearrangement blocks 12 and 16 rearranging orders of encoded code symbols so as to divide the encoded code symbols into redundancy codes to be transmitted and redundancy codes not to be transmitted, respectively, symbol repetition or pruning blocks 13 and 17 generating code symbol streams having demanded lengths by symbol repetition or pruning of the rearranged code symbols (i.e. symbol-repeating or pruning the rearranged code symbols so as to generate code symbol streams of the demanded lengths corresponding to transmission energy allocated to the data to be newly transmitted or to be retransmitted, a series connection block 18 generating one code symbol stream from the respective symbol-repeated or pruned code symbols, an interleaver 19 interleaving the multiplexed code symbol stream, a modulator 20 modulating the interleaved code symbol stream, and a spreader 21 spreading the modulated code symbol stream using one Walsh, code.

Namely, the transmission end has generation blocks each of which includes the CRC & tail bit adding block 10 or 14 to generate a new transmission packet to transmit new information and a retransmission packet, the turbo encoder 11 or 15, the interleaver 19, and the symbol repetition or pruning block 13 or 17. The generation blocks increase in proportional to a count of retransmission of random data.

Therefore, the CRC & tail bit adding block 10 or 14 adds the CRC for the error check and, the tail bit to an information bit the receiving end wants to transmit.

The turbo encoder 11 or 15 encodes the bit stream to which the CRC and tail bit are added into the turbo code having the ⅕ code rate.

The first or second symbol rearrangement block 12 or 16 rearranges the order of the code symbols encoded into the turbo code. Namely, the symbol rearrangement blocks 12 and 16 rearrange the orders of the input code symbols so as not to carry out the interleaving in order to change a bust error into a random error as a channel interleaver of the related art but to support an incremental redundancy effectively.

In other words, the orders of the code symbols are adjusted properly so as to divide the currently generated transmission signal into the redundancy code included in the new transmission packet to be transmitted and the other redundancy code included in the retransmission packet to be transmitted (the redundancy code failing to be included in the previous transmission signals). Such an operation of the symbol rearrangement block 12 or 16 enables a symbol repetition or pruning process of a next stage to be executed with ease.

The symbol repetition or pruning block 13 or 17 symbol-repeats or prunes the order-rearranged code symbols as many as a predetermined count of symbols in order to meet a count of the encoded symbols with transmission energy allocated to the new transmission and the retransmission respectively.

Figure 3:
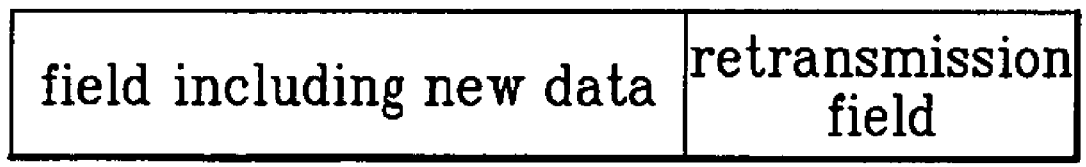
FIG. 3 illustrates a diagram of an output result of a series connection block in FIG. 2.

The series connection block time-multiplexes the respective symbols symbol-repeated or pruned by the symbol repetition or pruning blocks 13 and 17 so as to generate one stream. Such a generated stream, as shown in FIG. 3, fills its upper field with the code symbols representing the new information and its lower field with the code symbols consisting of the redundancy codes failing to be transmitted in the previous transmission signal.

And, the interleaver 19 interleaves the respective code symbols in the upper and lower fields in the above-filled code symbols.

Thereafter, the code symbols are modulated by the modulator 20, and then spread by the spreader 21 using one Walsh code.

Table 1 illustrates the energy allocating amount for a reverse link HARQ system constructed using TDM on the assumption that the transmission end allows the retransmission once. This example assumes that the retransmission energy is allocated in a manner that only 25% of the receiving energy for the initial transmission energy of the corresponding retransmission data is basically received on retransmission.

In the TDM system according to the present invention, a set of the data rate enabling to be adjusted by the dedicate rate control consists of 8 elements of {9.6 kbps, 19.2 kbps, 38.4 kbps, 76.8 kbps, 153.6 kbps, 307.2 kbps, 614.4 kbps, 1024 kbps}.

In this case, assuming that total energy for the transmission of the data rate of 9.6 kbps is 1, energy for the rest data rate is normalized as 2, 4, 8, 16, 32, 64, and 107.

TABLE 1

| R/eng. | 1 | | 2 | | 4 | | 8 | | 16 | | 32 | | 64 | | 107 | |
|---|---|---|---|---|---|---|---|---|---|---|---|---|---|---|---|---|
| N/eng. | R | N | R | N | R | N | R | N | R | N | R | N | R | N | R | N |
| 1 | 1 | 0 | 1 | 1 | 1 | 2+R | 1 | 4+R | 1 | 8+R | 1 | 16−P | 1 | 32+R | 1 | 64+R |
| 2 | 1 | 0 | 1 | 1 | 1 | 2+R | 1 | 4+R | 1 | 8+R | 1 | 16−P | 1 | 32+R | 1 | 64+R |
| 4 | 1 | 0 | 1 | 1 | 1 | 2+R | 1 | 4+R | 1 | 8+R | 1 | 16−P | 1 | 32+R | 1 | 64+R |
| 8 | 1 | 0 | 2 | 0 | 2 | 2 | 2 | 4+R | 2 | 8+R | 2 | 16−P | 2 | 32+R | 2 | 64+R |
| 16 | 1 | 0 | 2 | 0 | 4 | 0 | 4 | 4 | 4 | 8+R | 4 | 16−P | 4 | 32 | 4 | 64 |
| 32 | 1 | 0 | 2 | 0 | 4 | 0 | 8 | 0 | 8 | 8 | 8 | 8 | 8 | 32+R | 8 | 64+R |
| 64 | 1 | 0 | 2 | 0 | 4 | 0 | 8 | 0 | 16 | 0 | 16 | 16 | 16 | 32+R | 16 | 64+R |
| 107 | 1 | 0 | 2 | 0 | 4 | 0 | 8 | 0 | 16 | 0 | 32 | 0 | 32 | 32 | 32 | 64+R |

(eng.: energy, R: re-transmission, N: new transmission)

Therefore, when the energy allocated to the data on new transmission or retransmission is 1, 2, 4, 8, 16, 32, 64, and 107 in Table 1, a lower field of a transmission signal at the point of determining the retransmission, as shown in FIG. 3, includes code symbols containing a redundancy code failing to be transmitted by the previous transmission signal. And, ¼ of the receiving energy for the initial transmission energy of the corresponding retransmission energy, as shown in Table 1, is allocated to the energy allocated to the code symbols. Moreover, once the retransmission is determined, energy for the incremental redundancy code of the retransmission data is allocated in the first place as well as the rest energy is allocated to the newly transmitted data.

Hence, on retransmission, the sum of the newly transmitted data and the transmission energy allocated to the retransmitted data will not to exceed the transmission energy determined by the data rate control.

When such a TDM system is used, one of the problems, which may occur, is that it is impossible to meet a count of the code symbols after the completion of multiplexing the respective code symbols only using the set of the previous data rates.

For instance, when a packet including random information is transmitted initially, it is assumed that the initially transmitted packet is transmitted at a speed of 76.8 kbps and at a time point of re-transmitting the packet, the mobile station is allowed to transmit with a speed of 153.6 kbps by a reverse link dedicate rate control. And, it is also assumed that the retransmission energy is adjusted so that the receiving energy of retransmitted packet will be 25% of the receiving energy for the initial transmission energy of the data to be retransmitted.

Therefore, energy corresponding to 19.2 kbps is allocated for the code symbol including the incremental redundancy code among the code symbols having the transmission speed of 153.6 kbps, and the rest energy is used for the newly transmitted code symbols.

In this case, the rest energy corresponds to 134.4 kbps, and such a data rate fails to exist in the previous data rate set. In order to settle such a problem, the transmission, sped of the newly transmitted code symbols is set up as 76.8 kbps and repetition of the code symbols is carried out so as to match the transmission speed of 134.4 kbps.

Accordingly, in order to generate code symbols having the transmission speed (ex. initial 76.8 kbps to 134.4 kbps) corresponding to the energy allocated to the newly transmitted data in Table 1 the code symbols having the energy amounting to R are repeated or the code symbols having the energy amounting to P are punctured. R (repetition energy) or P (puncturing energy) means that the corresponding code symbols are symbol-repeated or punctured in order to fill the transmission energy corresponding to the data rate determined by the reverse link dedicate data rate control.

There is another method of fragmenting the previous set of data rates by 9.6 kbps unit. Such a method is troublesome in determining the entire data rates corresponding to 1 to 107 from a view point of energy. Besides, having an advantage of increasing a filing efficiency in packet generation, such a method has a disadvantage of increasing a count of reverse rate indicators (hereinafter abbreviated RRI) designating a data rate of a reverse link.

Namely, 8 kinds of data rates of the reverse link are basically considered currently, thereby enabling to represent the data rate by RRI of 3 bits. Yet, RRI of 7 bits are required for designating 107 data rates from 1 to 107.

Significantly, a unit of minimum energy for retransmission considers 1, i.e. 9.6 kbps, as normalized energy.

Second, the CDM system is applied to an embodiment of the present invention.

It is considered to use two kinds of code channels, a reverse supplemental channel 1 and a reverse supplemental channel 2 in the reverse link of the current 1x-EV DV.

And, four kinds of data rates, {9.6 kbps, 19.2 kbps, 38.4 kbps, 76.8 kbps}, are considered for the reverse supplemental channel 2.

In the embodiment according to the present invention, the reverse supplemental channel 1 is always used as a physical channel for new transmission and the reverse supplemental channel 2 is always used as a physical channel for retransmission.

Figure 4:
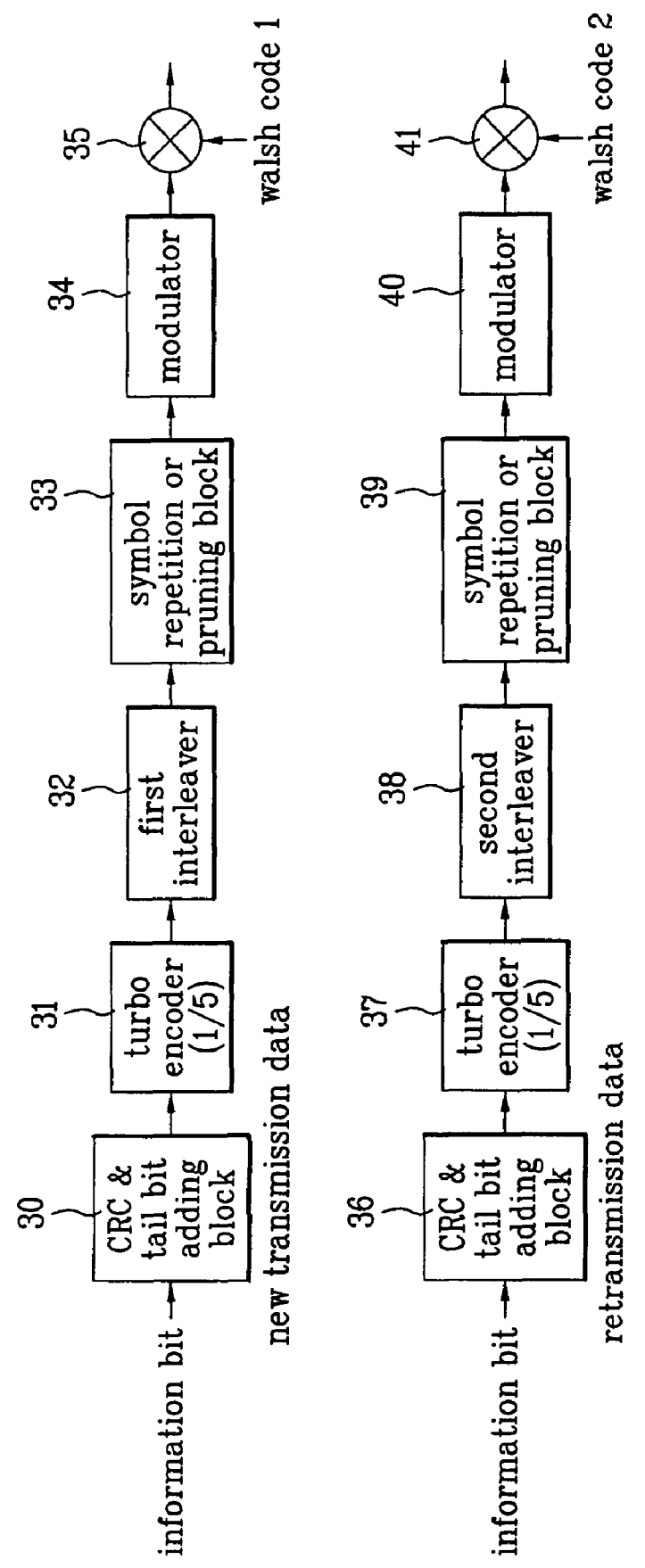
FIG. 4 illustrates a functional block diagram for generating a transmission signal using a CDM system according to the first embodiment of the present invention.

FIG. 4 illustrates a functional block diagram for generating a transmission signal using a CDM system according to the first embodiment of the present invention.

Referring to FIG. 4, a system of generating a transmission signal using CDM according to the present invention is constructed as follows. In order to generate code symbols including new information (newly transmitted data) and other code symbols including a redundancy code failing to be transmitted through a packet (data to be retransmitted) having received NAK in the previously transmitted signals from a receiving end, a transmission end for each channel includes CRC & tail bit adding blocks 30 and 36 adding CRC (cyclic redundancy code) for an error check to an information bit a receiving end wants to transmit, turbo encoders 31 and 37 encoding outputs of the blocks 30 and 36 into turbo codes of ⅕ code rate, first and second interleavers 31 and 38 rearranging orders of encoded code symbols to prevent a transmission error so as to divide the encoded code symbols into redundancy codes to be transmitted and redundancy codes not to be transmitted, respectively, symbol repetition or pruning blocks 33 and 39 generating a length of a predetermined code symbol stream corresponding to transmission energy allocated to the data to be newly transmitted and the other data to be retransmitted by symbol repetition or pruning of the rearranged code symbols, modulators 34 and 40 modulating the symbol-repeated or pruned code symbols, and spreaders 35 and 41 spreading the modulated code symbol stream using respective Walsh codes.

Therefore, the CRC & tail bit adding block 30 or 36 adds the CRC fox the error check and the tail bit to the information bit (data to be newly transmitted or be retransmitted) to be transmitted to the receiving end.

The turbo encoder 31 or 37 encodes the bit stream to which the CRC and tail bit are added into the turbo code having the ⅕ code rate.

The first or second interleaver 32 or 38 rearranges the order of the code symbols encoded into the turbo code. Namely, the interleavers 32 and 38 change a bust error into a random error as a channel interleaver of the related art as well as the order of the encoded symbols is properly adjusted so as to distinguish the redundancy code, which is to be contained in the data to be newly transmitted or fails to be transmitted to the previously transmitted data.

The symbol repetition or pruning block 33 or 39 symbol-repeats or prunes the rearranged code symbols as many as a predetermined count of symbols in order to meet a count of the encoded symbols with transmission energy allocated to the new transmission and the retransmission respectively.

Thereafter, the code symbols are modulated by the modulator 34 or 40, and then spread to the corresponding Walsh code by the spreader 35 or 41 so as to be transmitted to the receiving end through the reverse supplemental channel 1 and the reverse supplemental channel 2.

In this case, portions of the code symbols, which are retransmitted through the reverse supplemental channel 2, except the redundancy code having been used for the original transmission are manipulated to be transmitted, thereby enabling to reduce an effective code rate through code combining in the receiving end.

Namely, the reverse supplemental channel 2 is allocated to a physical channel for the retransmission to the packet from which NAK is generated, and then the Walsh code for channel is allocated independently. Thus, a code multiplexing method using the allocated Walsh code may be considered.

Table 2 illustrates, when a count of retransmission is set to 1, the normalized energy allocated to a code symbol the newly transmitted data or a code symbol including an incremental redundancy code for the data, to be retransmitted in a reverse link HARQ system using CDM, where 'channel 1' or 'channel 2' indicates one of the reverse supplemental channels.

Table 2 has the same assumption of Table 1. Namely, This example 2 assumes that a transmission power level on retransmission is determined in a manner that only 25% of the receiving energy for the initial transmission energy of the corresponding retransmission data becomes the receiving energy on retransmission.

Moreover, a data rate set usable for the reverse supplemental channel 2 is {2.4 kbps, 4.8 kbps, 9.6 kbps, 19.2 kbps, 38.4 kbps, 76.8 kbps, 153.6 kbps, and 307.2 kbps}.

In this case, if the energy corresponding to 9.6 kbps is normalized as 1, the energy usable for the data to be retransmitted is represented by {0.25, 0.5, 1, 2, 4, 8, 16, and 32}. And, the energy for the newly transmitted data is the same case of the previous reverse supplemental channel 1, i.e. {1, 2, 4, 8, 16, 32, 64, 107}.

For instance, the data rate of the newly transmitted data is 38.4 kbps, an error occurs in the packet transmitted to the receiving end at this speed, and NAK for the corresponding packet is transmitted to the transmission end from the receiving end. Therefore, assuming that an allowable data rate by the reverse link dedicate rate control is 153.6 kbps at the time point of determining the retransmission, the transmission energy of 9.6 kbps is allocated to the code symbols for the data to be retransmitted on retransmission. In this case, the transmission energy of the retransmission is allocated so that 25% of the receiving energy for the initial transmission energy of the corresponding retransmission data becomes the receiving energy on the retransmission.

to use fails to be used entirely. If it is transmitted at 153.6 kbps, energy about 101 or {(1+16)/16}=0.26 dB is further used than the entire energy allowed for the terminal to use.

Such an additional energy is allowable so that the terminal enables to select the data rate for the reverse supplemental channel 1.

Figure 5:
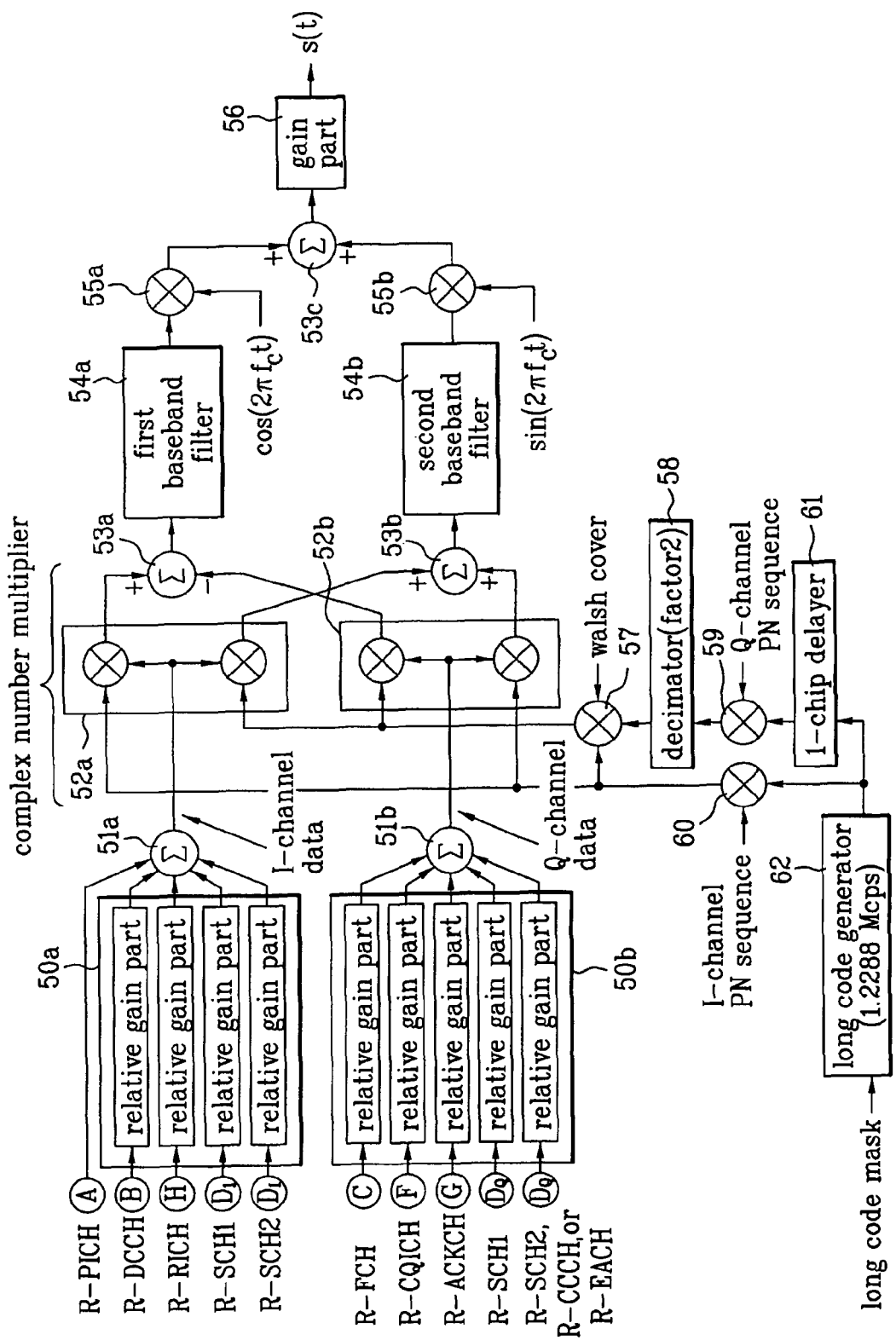
FIG. 5 illustrates a device block diagram of a process of generating a transmission signal using the CDM system according to the first embodiment of the present invention.

FIG. 5 illustrates a device block diagram of a process of generating a transmission signal using the CDM systems according to the first embodiment of the present invention.

Referring to FIG. 5, the reverse supplemental channels (hereinafter abbreviated R-SCH1 and R-SCH2) together with other channels R-PICH, R-DCCH, R-RICH, R-FCH, R-CQICH, and R-ACKCH are divided into I channel and Q channel respectively. Namely, the R-SCH1 and R-SCH2 together with the R-PICH, R-PDCCH, and R-RICH are divided into the I channel, and the R-SCH1 and R-SCH2 together with the R-FCH, R-CQICH, and P-ACKCH are divided into the Q channel. When the R-SCH2 is not used, the R-CCCH or R-EACH is transmitted.

Therefore, the code symbols of the respective channels included in the I or Q channel are transferred to the respective relative gain parts 50a 50b so as to further include relative gains, and then synthesized as one code symbols for the I and Q channels by adders 51a and 51b, respectively. These synthesized code symbols are called I channel data and Q channel data.

The I or Q channel data is multiplied by a code resulted from multiplying an I channel sequence (60) by a long code generated from a long code generator 61 (one of the adders 52a and 52b).

A code, which is delayed by an one-chip delayer 61 from the generated long code is multiplied by a Q channel sequence (59), detected by a decimator 58 by ½ chip unit so as to be multiplied by a Walsh cover 57, and then multiplied by the I or Q channel data. (the other adder 52a or 52b.

The code symbols, which are generated from being multiplied by the I channel data, and the other code symbols, which are generated from being multiplied by the Q channel data, in the finally multiplied symbols are synthesized by each adder 53a or 53b, band-passed by a first or second baseband filter 54a or 54b, multiplied by a carrier wave cos2.pi.fct or sin2.pi.fct (55a, 55b) so as to be synthesized by an adder 53c,

TABLE 2

| R/eng. | 1 | | 2 | | 4 | | 8 | | 16 | | 32 | | 64 | | 107 | |
|---|---|---|---|---|---|---|---|---|---|---|---|---|---|---|---|---|
| I/eng. | CH 2 | CH 1 | CH 2 | CH 1 | CH 2 | CH 1 | CH 2 | CH 1 | CH 2 | CH 1 | CH 2 | CH 1 | CH 2 | CH 1 | CH 2 | CH 1 |
| 1 | 1 | 0 | 1 | 1 | 1 | 2 | 0.25 | 8 | 0.25 | 16 | 0.25 | 32 | 0.25 | 64 | 0.25 | 107 |
| 2 | 1 | 0 | 1 | 1 | 1 | 2 | 1 | 4 | 0.5 | 16 | 0.5 | 32 | 0.5 | 64 | 0.5 | 107 |
| 4 | 1 | 0 | 1 | 1 | 1 | 2 | 1 | 4 | 1 | 16 | 1 | 32 | 1 | 64 | 1 | 107 |
| 8 | 1 | 0 | 2 | 0 | 2 | 2 | 2 | 4 | 2 | 8 | 2 | 32 | 2 | 64 | 2 | 107 |
| 16 | 1 | 0 | 2 | 0 | 4 | 0 | 4 | 4 | 4 | 8 | 4 | 16 | 4 | 64 | 4 | 107 |
| 32 | 1 | 0 | 2 | 0 | 4 | 0 | 8 | 0 | 8 | 8 | 8 | 16 | 8 | 32 | 8 | 64 |
| 64 | 1 | 0 | 2 | 0 | 4 | 0 | 8 | 0 | 16 | 0 | 16 | 16 | 16 | 32 | 16 | 64 |
| 107 | 1 | 0 | 2 | 0 | 4 | 0 | 8 | 0 | 16 | 0 | 32 | 0 | 32 | 32 | 32 | 64 |

(R/eng.: re-transmission energy, I/eng.: initial transmission energy)

And, the remaining energy after the allocating for the code symbols including the incremental redundancy code is allocated to the code symbols for the newly transmitted data. In this case, the data rate for the code symbols of the newly transmitted data can be determined as 76.8 kbps or 153.6 kbps.

If the data rate of the reverse supplemental channel 1 is determined as 76.8 kbps, the energy allowed for the terminal and, then transferred to a gain part 56 to include more gain so as to generate a final transmission signal S(t).

Second Embodiment

A second embodiment according to the present invention, in applying HARQ to a reverse link, proposes a method of adjusting transmission energy on transmission, in which a packet receiving NACK from a receiving end due to poor receiving status should be received with a predetermined portion of energy less than the receiving energy for the initial transmission energy of the packet on retransmission.

And, the second embodiment according to the present invention proposes a method of optimizing a packet throughput of a reverse link using a spare energy space, which is provided by using such an energy reduction method on retransmission, for the transmission of a new packet.

Moreover, the second embodiment according to the present invention proposes a method of combining the energy reduction automatic retransmission technique with a data dedicate rate control technique for a reverse traffic.

Yet, the second embodiment according to the present invention proposes uses a technique of adjusting a traffic energy level of the packet to be retransmitted in a manner that a receiving energy level at a base transceiver system of the retransmitted packet should become a predetermined portion compared to the receiving energy level of an initial transmission packet of the packet to be retransmitted.

Assuming that the receiving energy level of a packet to be newly transmitted is 1, the receiving energy of the packet to be retransmitted is adjusted so as to be .alpha.(0<.alpha..quadrature.1). Resultingly, the base transceiver system enables to use energy amounting to (1+.alpha.) for a decoding process by combining the receiving energy of the packet to be newly transmitted with the receiving energy of the packet to be retransmitted. In this case, the fact that it is able to adjust the energy level of the packet to be retransmitted to an amount what we demand means that a pilot channel of the reverse link undergoes a reverse link energy control. Accordingly, the energy level of the reverse link pilot channel undergoes a power control by the base transceiver system so as to keep a constant level. And, energy gain values of other channels of the reverse link are adjusted so as to have a constant ratio to a transmission energy level of the pilot channel.

Therefore, assuming that a traffic-to-pilot power ratio (TPR) of the newly transmitted packet is G.sub.first, the method used by the present invention adjusts a traffic-to-pilot power ratio G.sub.Ro-Tx to be used for re-transmitting the packet into .alpha..quadrature.G.sub.first.

As a result of such adjustment, the receiving energy of the retransmitted packet received by the base transceiver system will be 100.alpha.% of the receiving energy of the initially transmitted packet of the retransmitted packet: A value of .alpha. is currently considered as one of 0.5, 0.25, and 0.125.

If .alpha. is 0.25, the transmission energy for the retransmission packet is adjusted so that the receiving energy of the retransmitted packet received by the base transceiver system becomes 25% of the receiving energy of the initially transmitted packet.

As mentioned in the foregoing description, if the technique of adjusting the transmission energy level of the energy on retransmission is taken, spare transmission energy is attained at the time point of the retransmission. The above-attained spare transmission energy is used for the transmission of a new packet, thereby enabling to increase a data throughput of the reverse link.

For such a purpose, the present invention uses a method of multiplexing the retransmission of the packet to which NACK is transmitted by the receiving end and the transmission of the new packet. In this case, CDM (code division multiplexing) and TDM (time division multiplexing) are considered for multiplexing the retransmission packet and new packet.

Therefore, The following channels are defined on the reverse link.

First, a channel for packet transmission of the reverse link is called a reverse packet data channel (R-PDCH). The R-PDCH is constructed with two kinds of sub-channels, R-NPDCH (reverse new packet data channel) used for transmitting a new packet and P-RPDCH (reverse retransmission packet data channel) for transmitting a retransmitted packet.

The two sub-channels are multiplexed using CDM or TDM.

First, when CDM is used, the R-NPDCH and R-RPDCH are transmitted on two physical channels independent reciprocally using different Walsh codes.

And, when TDM is used, the retransmission and the new transmission are multiplexed in due time on one physical channel using one Walsh code.

Figure 6:
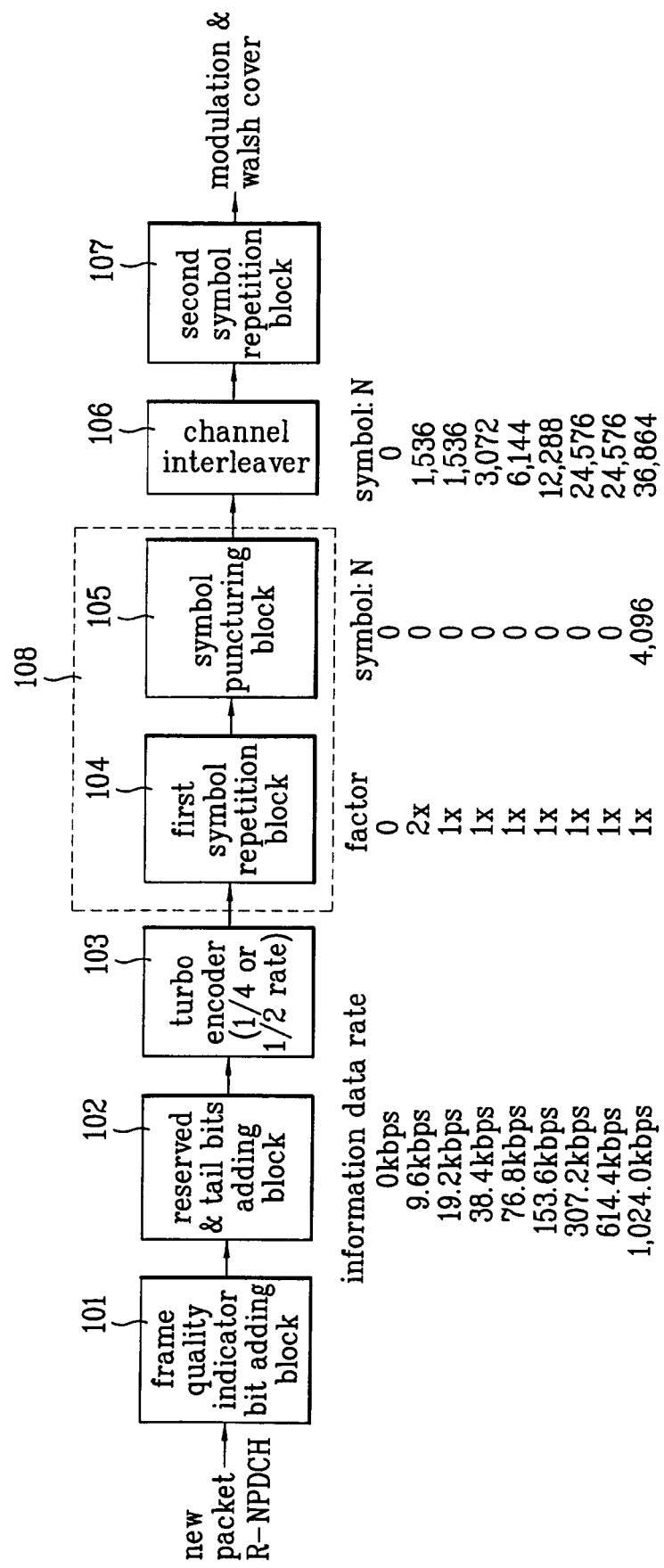
FIG. 6 illustrates a block diagram of an example for a transmission chain construction of R-NPDCH for an initially-transmitted packet according to a second embodiment of the present invention.

FIGS. 6 to 9 illustrate a transmission chain construction considering CDM. Specifically, FIG. 5 and FIG. 6 illustrate transmission chain constructions of the respective channels R-RPDCH and R-NPDCH considering a chase combining in the HARQ system.

FIG. 6 illustrates a block diagram of an example for a transmission chain construction of R-NPDCH for a newly transmitted packet according to a, second embodiment of the present invention.

Figure 7:
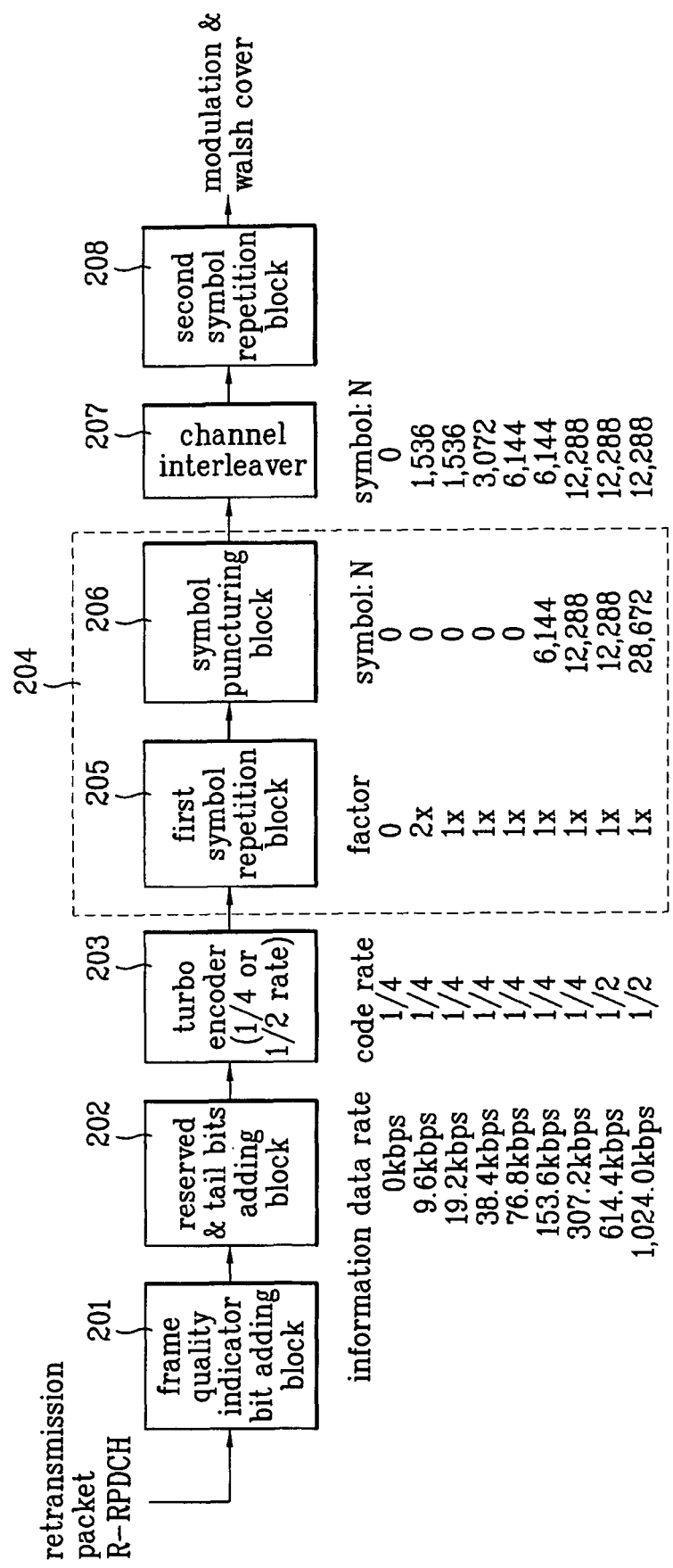
FIG. 7 illustrates a, block diagram of an example for a transmission chain construction of R-RPDCH for a retransmission packet according to the second, embodiment of the present invention.

FIG. 7 illustrates a block diagram of an example for a transmission chain construction of R-RPDCH for the retransmitted packet transmission according to the second embodiment of the present invention.

Referring to FIG. 6 and FIG. 7, the R-NPDCH and R-RPDCH construct transmission chains including frame quality indicator bit adding blocks 101 and 201, reserved & tail bit adding blocks 101 and 202, turbo encoders (¼ and ½ rates) 103 and 203, first symbol repetition blocks 104 and, 205, symbol puncturing blocks 105 and 206, channel interleavers 106 and 207, and second symbol repetition blocks 107 and, 208, respectively.

The first symbol repetition block/symbol puncturing block 104/105 and the first symbol repetition block/symbol puncturing block 205/206 construct rate matching blocks 108 and 204, respectively.

First of all, a frame quality indicator bit or 16 bits is added to a packet data transmitted from the upper. And, a tail bit and a reserved bit are added thereto. Then, the packet data undergoes a turbo encoding process.

After the encoding process, a rate matching process with a length of a channel interleaver to be used is carried out through symbol repetition and symbol puncturing processes.

Each of the second symbol repletion blocks 107 and 208 should carry out a number of the repetition as much as a proper quantity according to a length of a Walsh code to be used in a modulation block (not shown in the drawing) and a Walsh cover block (not shown in the drawing) at a rear end.

Such a construction is based on the assumption of the chase combining of type I in the combining process of the HARQ system.

At the lower part of the respective blocks in FIG. 5, provided are data transfer rates (0, 9.6 kbps, 19.2 kbps, 38.4 kbps, 76.8 kbps, 153.6 kbps, 307.2 kbps, 614.4 kbps, 1024 kbps) of R-NPDCH in case of using the chase combining or partial chase combining, effective code rates (½ or ¼), repetition factors (2×, 1×, 0) of symbol, puncturing quantity (0, 4096) of symbol, lengths (1536, 1536, 3072, 6144, 12288, 24576, 24576, 36864) of the used channel interleaver, and the like.

At the lower part of the respective blocks in FIG. 6, provided are data transfer rates (0, 9.6 kbps, 19.2 kbps, 38.4 kbps, 76.8 kbps, 153.6 kbps, 307.2 kbps, 614.4 kbps, 1024 kbps) of R-RPDCH in case of using the chase combining or partial chase combining, effective code rates (½ or ¼), repetition factors (2×, 1×, 0) of symbol, puncturing quantity (0, 6144, 12288, 12288, 28672) of symbol, lengths (1536, 1536, 3072, 6144, 6144, 12288, 12288, 12288, 12288) of the used channel interleaver, and the like.

The data rate of the data to be retransmitted for the R-RPDCH has the same information data rate of the R-NPDCH used for the initially transmitted data of the data to be retransmitted.

Namely, assuming that the data rate having been used for the newly transmitted packet was 38.4 kbps and that NACK is transmitted from the receiving end due to an error occurring at the packets the transmission chain corresponding to 38.4 kbps of the R-RPDCH is used on retransmission.

Moreover, in the transmission chain of the R-RPDCH, the code rate of the turbo encoder 203 is the same of the R-NPDCH in FIG. 6.

Yet, it is limited in the diffusion process that a minimum diffusion factors available for the R-NPDCH and the R-NPDCH are 2 and 4, respectively. Accordingly, an effective code rate from a specific data rate is changed after passing the symbol puncturing block 206.

Namely, the chase combining is carried out on the transmission data rates to 76.8 kbps with the turbo code of 1/4 code, but portions of the encoded code symbols are retransmitted for the data rates higher that 76.8 kbps (i.e. 153.6 kbps.about.1034 kbps). Therefore, the partial combining is carried out.

Figure 8:
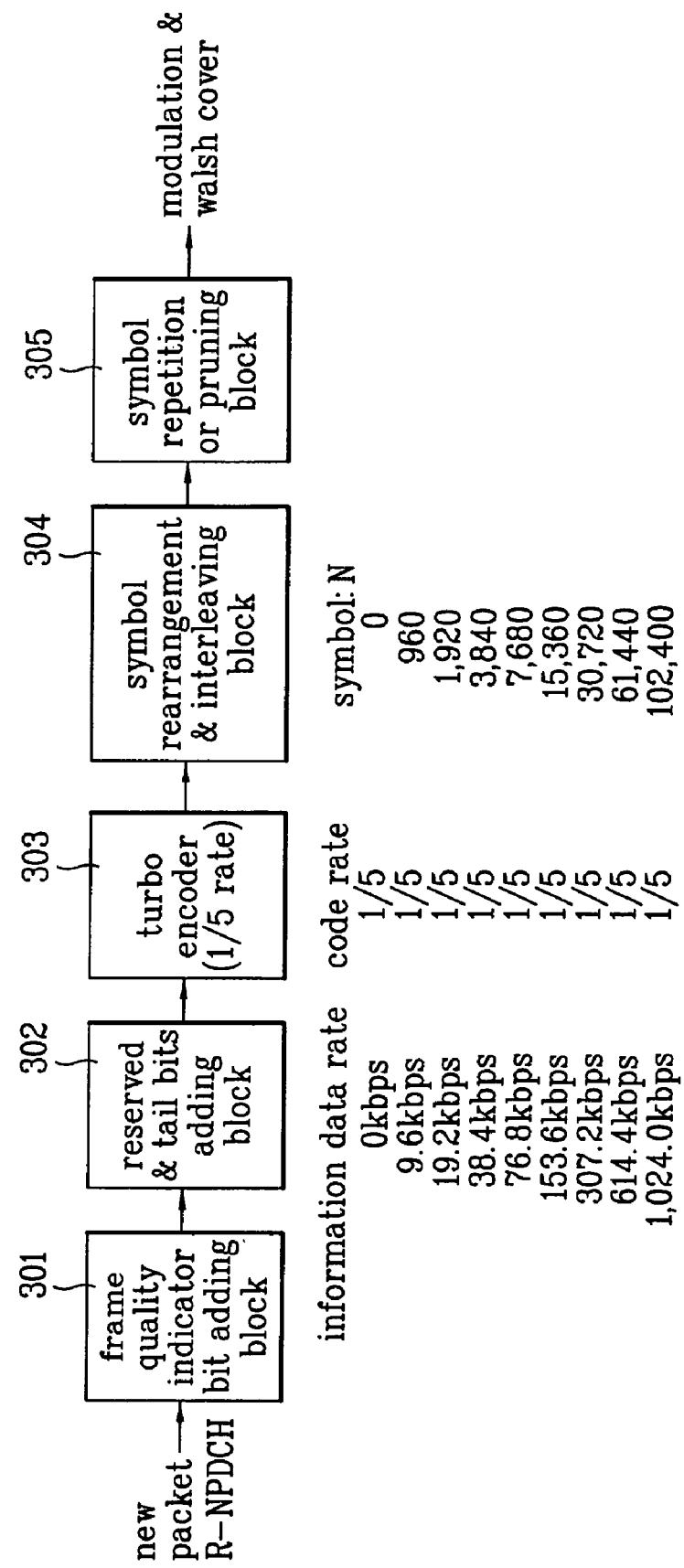
FIG. 8 illustrates a block diagram of another example for a transmission chain construction of R-NPDCH for an initially transmitted packet according to the second embodiment of the present invention.
Figure 9:
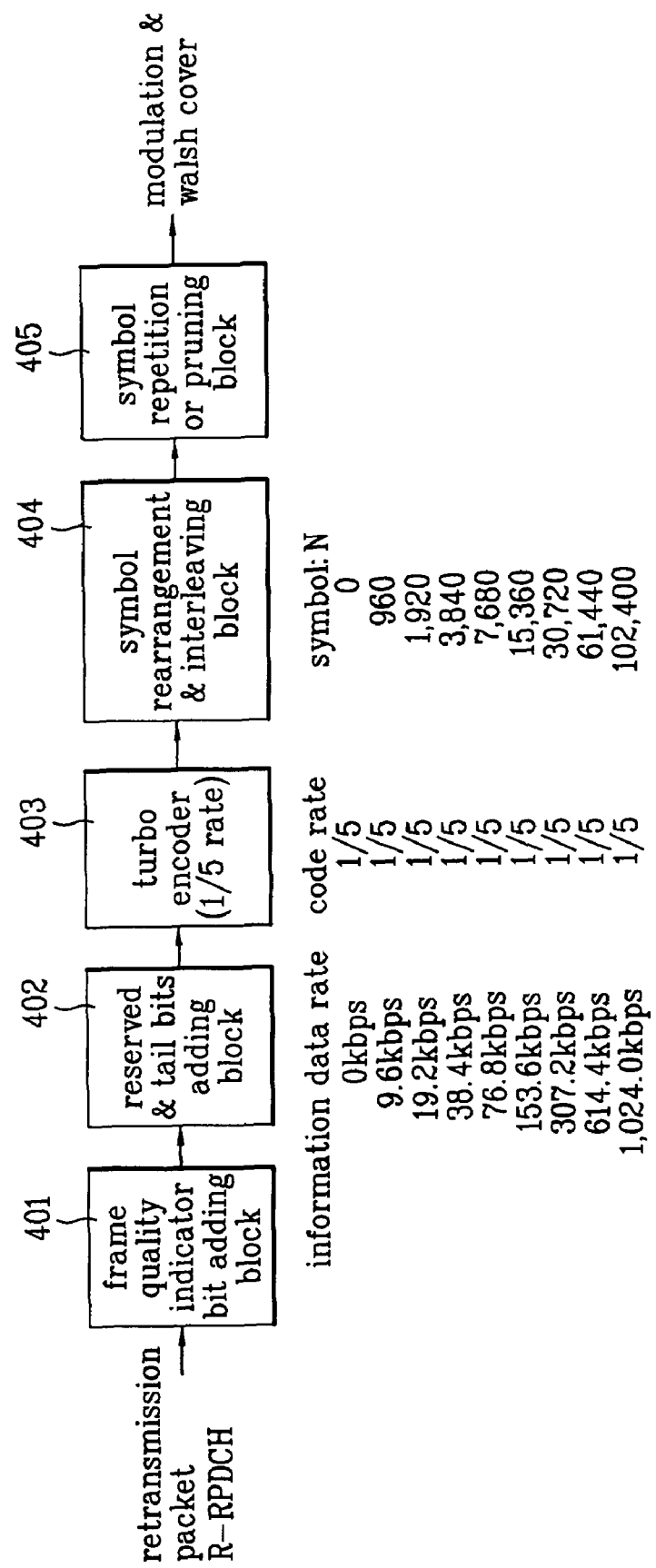
FIG. 9 illustrates a block diagram of another example for a transmission chain construction of R-RPDCH for a retransmission packet according to the second embodiment of the present invention.

If the incremental redundancy transmission process is considered, another transmission chain of R-NPDCH or R-RPDCH in FIG. 8 or FIG. 9 should be taken into consideration.

FIG. 8 illustrates a block diagram of another example of a transmission chain construction of R-NPDCH for a newly transmitted packet according to the second embodiment of the present invention.

FIG. 9 illustrates a block diagram of another example of a transmission chain construction of R-RPDCH for a retransmitted packet transmission according to the second embodiment of the present invention.

Referring to FIG. 8 and FIG. 9, the R-NPDCH and R-RPDCH construct transmission chains including frame quality indicator bit adding blocks 301 and 401, reserved & tail bit adding blocks 302 and 402, turbo encoders (1/5 rate) 303 and 403, symbol rearrangement & interleaving blocks 304 and 404, and symbol pruning or repetition blocks 305 and 405, respectively.

First of all, a frame quality indicator bit of 16 bits is added to a packet data transmitted from the upper by the frame quality indicator bit adding block 301 or 401. And, a tail bit and a reserved bit are added thereto by the reserved & tail bit adding block 302 or 402. Then, the packet data undergoes a turbo encoding process by the turbo encoder 303 or 403.

After the encoding process, a redundancy code, which is included in the packet to be newly transmitted so as to be transmitted, or a, redundancy code (which has failed to be included in the previous transmission signal), which is included in the other packet to be retransmitted so as to be transmitted, is divided into by the symbol rearrangement & interleaving block 304 or 404, and an order of the symbols is properly adjusted so as to prevent as bust transmission error. Such an operation of symbol rearrangement & interleaving enables the next step of symbol repetition or pruning to be carried out with ease.

Each of the symbol pruning & repletion blocks 305 and 405 carries out a number of the pruning or repetition as many as a count of the predetermined symbols of which order is rearranged so as to meet the count of the encoded symbols allocated to the newly transmitted or retransmitted packet.

In FIG. 8 and. FIG. 9, when the incremental redundancy combining process is considered the R-NPDCH or R-RPDCH always uses the turbo encoder 303 or 403 of 1/5 code rate. Moreover, the symbol rearrangement & interleaving blocks 304 and 404 should be designed so as to carry out both roles of rearrangement (re-ordering) and channel interleavers of the code symbols for the incremental redundancy process.

At the lower parts in FIG. 8 and FIG. 9, provided are code rates of the turbo encoders 303 and. 403 and interleaving lengths in accordance with the data transfer rates of the R-NPDCH and R-RPDCH.

In, FIG. 9, the symbol rearrangement & interleaving block 404 of the R-RPDCH should follow the same interleaving regulation of the other symbol rearrangement & interleaving block 304 of the R-NPDCH.

Resultantly, the orders of the rearranged symbols of the R-NPDCH and R-RPDCH after the interleaving are identical to each other. In this case, the code symbols, which will be transmitted in the R-RPDCH, are transmitted in a manner of a wrap round system from the code symbol following the last code symbol having been transmitted form the R-NPDCH. Through such a system, the base transceiver system enables to make the minimum effective code rate when the packets to be newly transmitted and to be retransmitted are combined with each other.

FIG. 10 illustrates diagrams of multiplexed R-NPDCH for an initial transmission and R-PDCH for a retransmission according to the second embodiment of the present invention.

Referring to FIG. 10, when a packet transmitted initially at an $j.sub.th$ packet time is transmitted to R-NPDCH using a transmission rate of R, let's assume that a base transceiver system transmits a NACK command to a terminal since an error occurs at the initially transmitted packet.

In this case, for convenience, it is assumed that the terminal carries out the retransmission of the packet having NACK just at the moment of transmitting an $(i+D).sub.th$ packet, where it is assumed that D is a delay time (packet unit) of HARQ.

The terminal having received NAK knows an initial transmission data rate R of the data to be retransmitted, whereby the data rate R-RPDCH will use for the retransmission of the initially transmitted data is a value having been already determined, R.

As mentioned in the foregoing description, the transmission power of the R-RPDCH is controlled so that the base transceiver system enables to receive a portion of the receiving energy for the initial transmission energy of the data to be retransmitted. If the TPR of the R-NPDCH for the initially transmitted data of the data to be retransmitted is $G.sub.first$, a TPR of the R-RPDCH at the time point of the retransmission is determined as $.alpha..multidot.G.sub.first$.

Therefore, on retransmission, the R-RPDCH will use a transmission chain corresponding to the transmission rate of R in FIG. 7 or FIG. 10 and the TPR of $.alpha..multidot.G.sub.first$.

FIG. 3 is a diagram assuming that D is 2. Namely, when the base transceiver system transmits NACK to the terminal for a packet-1 of the R-NPDCH, the terminal carries out the retransmission, for the packet-I having the NACK through the R-RPDCH at the transmission time point of a packet-3. In this case, the transmission speed of the packet-3 of the R-RPDCH becomes the same of the packet-1 of the R-NPDCH, and the TPR is determined as $.alpha..multidot.G.sub.first$. Besides, the data transmission rate of the R-NPDCH is determined by the following process in accordance with the transmission energy which is allowed to the terminal to transmit at the retransmission time point.

From now on, let us consider the case that the base transceiver system controls the traffic transmission data rate of each terminal.

The base transceiver system maintains the reverse traffic transmission data rate of the terminal, or commands an RRC bit (which indicates increment or decrement) to the terminal through F-CRCCH (forward common rate control channel.

The terminal having received such a command checks the RRC bit so as to determine the combining data rate to be transmitted in accordance with a command of the base transceiver system. The transmission power the terminal will use will be determined in accordance with the combining data rate. Such a combining data rate will be called an effective data rate $R_{eff}$.

Substantially, the reverse link dedicate rate control carried out by the base transceiver system is to adjust the quantity of total power of the terminal which is received by the base transceiver system. In this case, let us assume that the base transceiver system has a spare amounting to $\alpha$ and generates the RRC bit which will be transmitted to each terminal. Namely, on the assumption that the energy received from the terminal may be maximum $(1+\alpha)$ times bigger, the base transceiver system generates the ARC bit.

How to carry out the multiplexing of the R-NPDCH and R-RPDCH according to each data rate control information is explained as follows.

First, let us assume that the data rate was R on the initial transmission for the R-RPDCH and that the terminal has kept on receiving the command that the terminal should maintain the data rate for the HARQ delay time (packet unit) of D from the base transceiver system.

Therefore, the terminal should use the transmission power corresponding to the effective rate of R. Yet, since the spare amounting to a has been considered when the RRC was generated in the base transceiver system the station, the terminal uses R as the data rate of the R-NPDCH to currently transmit and the R-RPDCH multiplexes the two channels with the data rate of R and the transmission power of $\alpha \cdot G_{first}$.

Resultingly, the terminal can use the energy as much maximum as 101 or $(1+\alpha)$dB additionally. If $\alpha$ is 0.25, the terminal can use the power of about 0.97 dB, which is bigger than the power allowed by the base transceiver system, to the utmost additionally. If $\alpha$ is 0.5, the terminal can use the power of about 1.7 dB, which is bigger than the power allowed by the base transceiver system to the utmost additionally.

However, since the data rate of R is determined with the spare between 0.97 dB and 1.7 dB from a view point of the base transceiver system, the accompanied deterioration of the performance is negligible.

Second, let us assume that the effective data rate at the retransmission time point increases so as to be twice faster than the initial transmission data rate of a predetermined packet after the delay time D of HARQ from the initial transmission of the predetermined packet.

And, let us assume that the data rate of the R-NPDCH was R on the initial transmission for the packet. In this case, the R-RPDCH for the retransmission of the packet at the retransmission time point will use the data rate of D and the TPR of $\alpha \cdot G_{first}$.

And, in case that the terminal is not caught by the maximum energy limit or that there exists sufficient quantity of data to be transmitted, it is assumed that the terminal increases the transmission data rate of the currently transmitted R-NPDCH according to the command of the RRC bit.

For convenience, it is assumed that the increased transmission data, rate of the R-NPDCH is 2R. The fact that the base transceiver system transmits the command of increasing the data rate means that the TPR the terminal enables to transmit should be made twice bigger than the current value.

In this case, the terminal can use the energy as much maximum as 101 or $(1+\alpha/2)$dB additionally. If $\alpha$ is 0.25, the terminal can use the power of about 0.51 dB, which is bigger than the power allowed by the base transceiver system, to the utmost additionally. If $\alpha$ is 0.5, the terminal can use the power of about maximum 0.97 dB, which is bigger than the power allowed by the base transceiver system, to the utmost additionally.

However, since the base transceiver system already has the spare 0.97 dB($\alpha$=0.25) or 1.7 dB($\alpha$=0.5) when the RRC bit was generated, the accompanied deterioration of the performance is negligible.

Third, let us consider that the terminal receives the command of reducing the data rate so as to be lower than that of the initial transmission of the packet at the retransmission time point after the delay time D of HARQ from the initial transmission time point of the predetermined packet.

And, let us assume that the data rate of the R-NPDCH was R for the initial transmission for the packet. The power allowed to the terminal to use at the retransmission time point is ½ of the power used for the initial transmission of the packet. Hence, the terminal carries out the retransmission through the R-RPDCH for the retransmission of the packet using the TPR value of $0.5 \cdot G_{first}$.

In this case, the transmission of the R-NPDCH for the data to be newly transmitted is not carried out. If the terminal receives the command of reducing the data rate down to ¼ of the value of the initial transmission of the packet at the retransmission time point after the delay time D of the HARQ, the terminal carries out just the transmission of the packet using the $\alpha$ value of 0.25.

Figure 11A:
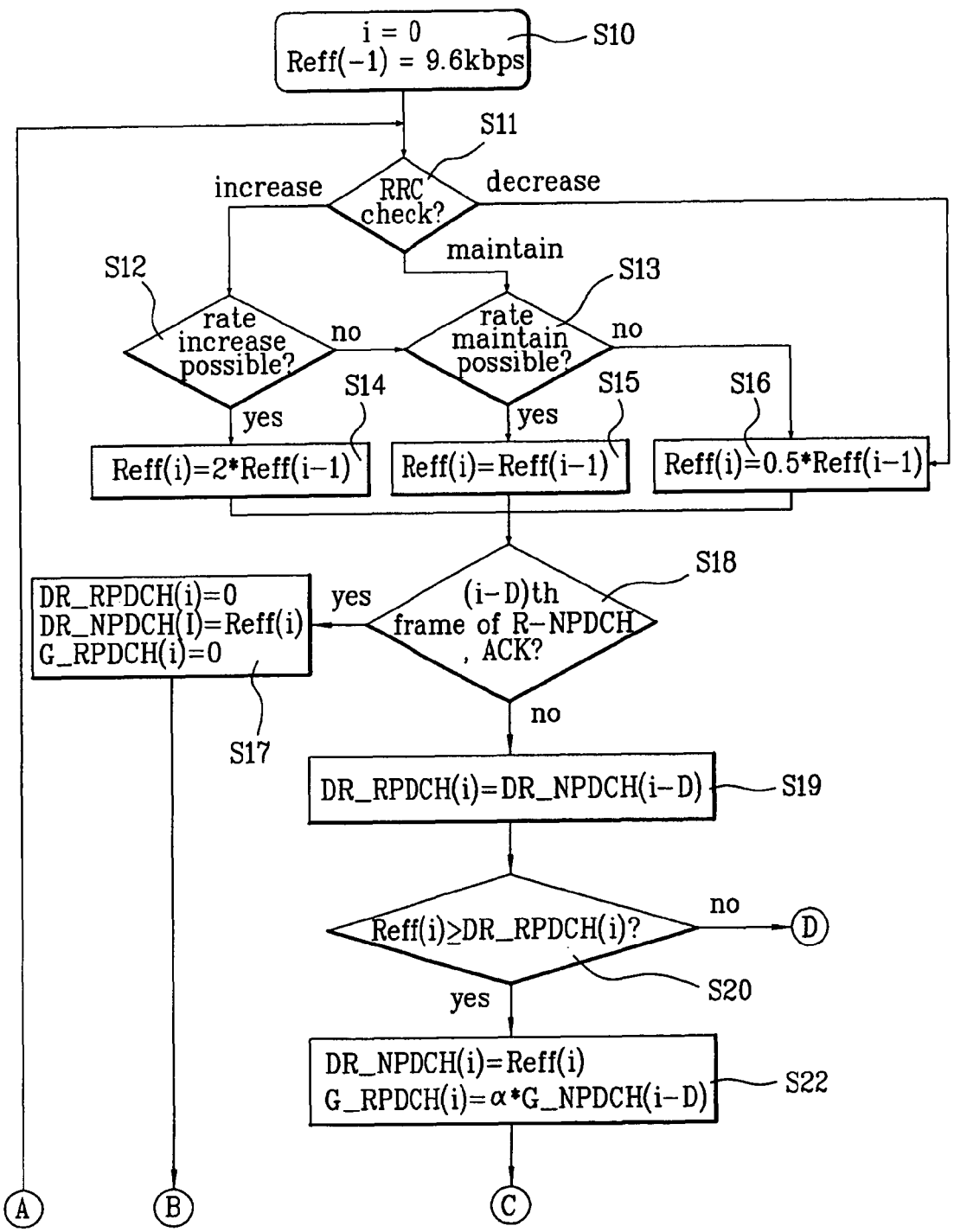
FIG. 11A and FIG. 11B illustrate flowcharts of examples for the systems of a reverse link traffic transmission data rate control of a base transceiver system and an energy reduction reverse link automatic retransmission according to the second embodiment of the present invention.
Figure 11B:
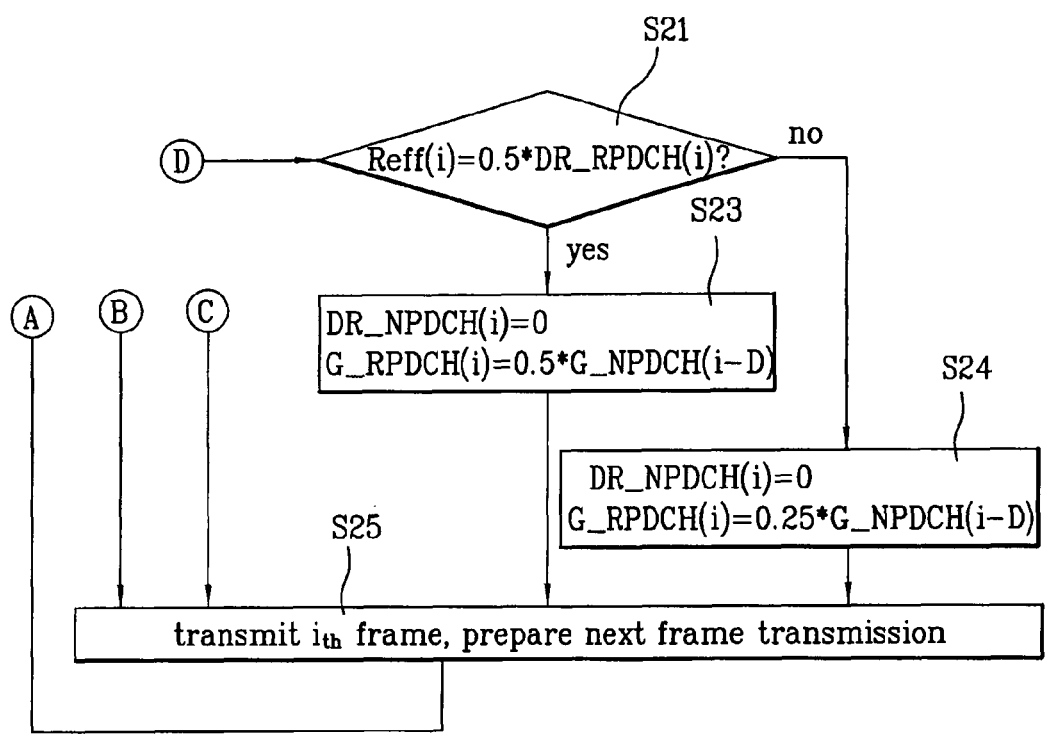

The algorithm of the combination of the HARQ system and the dedicate data rate control system can be expressed through the flowcharts like FIG. 11A and FIG. 11B.

FIG. 11A and FIG. 11B illustrate flowcharts of examples for the systems of a reverse traffic transmission data rate control of a base transceiver system and an energy control according to the second embodiment of the present invention.

Referring to FIG. 11A and FIG. 11B, the terminal, if having data to transmit, always starts transmitting the data at the transmission speed of 9.6 kbps without the approval of the base transceiver system. Hence, $R_{ef}(-1)$ is defined as 9.6 kbps in FIG. 10A and FIG. 10B. And, from the packet time I=0, the terminal undergoes a data transmission speed dedicate control from the base transceiver system (S10).

At a time point of transmitting an $i_{th}$ packet, the terminal receives the RRC bit (reverse rate control) generated from the base transceiver system so as to determine an effective data transmission speed $R_{eff}(i)$ according to the RRC bit (S11).

Even if the terminal receives a command of increasing the transmission speed from the base transceiver system through the RRC bit, the terminal enables to maintain or reduce the effective data transmission speed in accordance with its status (S12 or S13).

Likewise, receiving a command of maintaining the transmission speed from the base transceiver system, the terminal enables to reduce the effective data transmission speed in accordance with its status.

Yet, receiving a command of receiving the transmission speed from the base transceiver system, the terminal always has to reduce the effective data transmission speed. In this case, the base transceiver system does not transmit the command of reducing the data transmission speed to the terminal of using the effective data transmission speed of 9.6 kbps.

Accordingly, the terminal updates the effective transmission speed R.sub.eff(i) in accordance with its status and the reverse link dedicate data transmission control (S14, S15, or S16). For instance, the corresponding terminal increases the data transmission speed twice higher than R.sub.eff(i-1) and decrease the data transmission speed ½ less than R.sub.eff(i-1) (S16).

Subsequently, the terminal checks whether ACK/NACK for an (i-D).sub.th R-NPDCH packet is transmitted from the bas station (S18).

If ACK is transmitted from the base transceiver system, the terminal transmits R-NPDCH only for the data to be currently transmitted at the time point of transmitting the i.sub.th packet. In this case there is no transmission of data in the R-RPDCH. Therefore, the data transmission speed of R-NPDCH for the data to be currently transmitted becomes R.sub.eff(i). Thus, DR_RPDCH (i) as a data, rate of the R-RPDCH is 0 at the time point of transmitting the i.sub.th packet, and DR_NPDCH(i) as a data rate of R-NPDCH for the data to be currently transmitted at the time point of the i.sub.th packet uses the previous R.sub.eff(i) Moreover, G_RPDCH(i) as a TPR of R-NPDCH for the data to be currently transmitted becomes 0 at the time point of transmitting the i.sub.th packet (S17). Therefore, the terminal transmits the R-NPDCH and prepares a transmission of the next packet (S25).

When the terminal receives a NACK command for the (i-D).sub.th R-NPDCH packet (S18), the DR_RPDCH(i) is updated as a value of the DR_NPDCH(i-D) (S19). And, the terminal compares the updated effective data transmission speed R.sub.eff(i) to the DR_NPDCH(i-D) of the transmission speed of R_NPDCH at the time point of transmitting the (i-D).sub.th packet (S20).

If the R.sub.eef(i) value is equal to or bigger than the DR_NPDCH(i-D) of the transmission speed of R_NPDCH at the time point of transmitting the (i-D).sub.th packet, the DR_NPDCH(i) of the transmission speed of the R_NPDCH to be transmitted at the time point of transmitting the i.sub.th packet is set up as R.sub.eff(i) (S22). And, the transmission speed of the R-RPDCH is the value previously determined as a speed transmitted in the (i-D).sub.th R-NPDCH packet.

In this case, the terminal transmits a new packet using the R-NPDCH transmission chain corresponding to the determined transmission speed in FIG. 6 or FIG. 8.

Likewise, for the retransmission packet, used is the transmission chain of R-RPDCH in FIG. 6 or FIG. 8 corresponding to the data transmission speed in the (i-D).sub.th R-NPDCH packet. In this case, as mentioned in the foregoing description, the transmission power of the R-RPDCH is adjusted so that the receiving energy of the retransmission packet received by the base transceiver system becomes a times to the initial receiving energy of the corresponding data to be retransmitted. For this, .alpha..quadrature.G_NPDCH (i-D) is used as the TPR (traffic-to-pilot power) ratio of the R-RPDCH, G_RPDCH(i) (S22).

If the R.sub.eff(i) value is ½ of the DR_RPDCH(i), which is the transmission speed of the R-NPDCH transmitted at the time point of transmitting the (i-D).sub.th packet, or smaller than the DR_RPDCH H(i) (S21), the DR_NPDCH (i) which is the transmission data rate of the R-NPDCH to be transmitted at the time point of transmitting the i.sub.th packet is set up as 0(S23 or S24).

In this case, it may be the circumstance (status) that there is no power sufficient for the transmission of new packet, all available power is used for the retransmission packet. Namely, used is the transmission chain of R-RPDCH in FIG. 6 or FIG. 8 corresponding to the data transmission rate in the (i-D)th R-NPDCH packet. And, the transmission power of R-RPDCH is adjusted so as to use all available power at the very time point.

The above process is described in the following example.

First, it is assumed that an initial transmission data rate for a packet is 76.8 kbps and that a delay time of HARQ is a delay time of 3 packets. In this case, after the initial transmission of the packet, it is also assumed that the terminal has received RRC bits of (down, down, up) from the base transceiver system for the delay time of the three packets. And, .alpha. is assumed to be 0.25.

If the terminal receives NACK for the initially transmitted packet, an effective data transmission rate available for the terminal to use becomes 38.4 kbps at a time point of retransmission. The effective transmission data rate is ½ of the transmission data rate of the initially transmitted packet, whereby there occurs no transmission of a packet to be newly transmitted at the time point of retransmission{R_NPDCH (i)=0}. And, a transmission data rate of R-RPDCH becomes the data rate of the initially transmitted packet, 75.8 kbps. Moreover, transmission energy to be used for retransmission of packet will the entire energy allowed by the effective data rate determined at the time point of retransmission. Hence, a TPR of R-RPDCH becomes ½ of the TPR used in the initial transmission of the packet(G_RPDCH(i)=0.5G_NPDCH(i-D).

For another example, it is assumed that RRC bits (up, up, down) are received from the base transceiver system for a delay time of 3 packets after initial transmission of the packet.

If the terminal receives NACK for the initially transmitted packet, an effective data transmission rate available for the terminal to use becomes 153.6 kbps at a time point of retransmission. The effective transmission data rate is bigger than the initial transmission data rate of the packet, whereby the transmission of the newly transmitted current packet and the transmission of the retransmitted packet at the time point of retransmission are time-multiplexed or code-multiplexed.

In this case, the transmission data rate of the newly transmitted packet becomes the effective transmission data rate, 153.6 kbps. In this case, the transmission data rate of R-RPDCH for the retransmission packet will be 76.8 kbps and a TPR will be 0.25 times of the TPR having been used in the initial transmission, of the packet to be retransmitted.

As mentioned in the foregoing description, if an energy reduction factor .alpha. is 0.5, when the method of multiplexing P-NPDCH and R-RPDCH using the flowcharts in FIG. 10A and FIG. 10B are used, there may be a slight chance to bring about a problem in the data rate control.

Figure 12A:
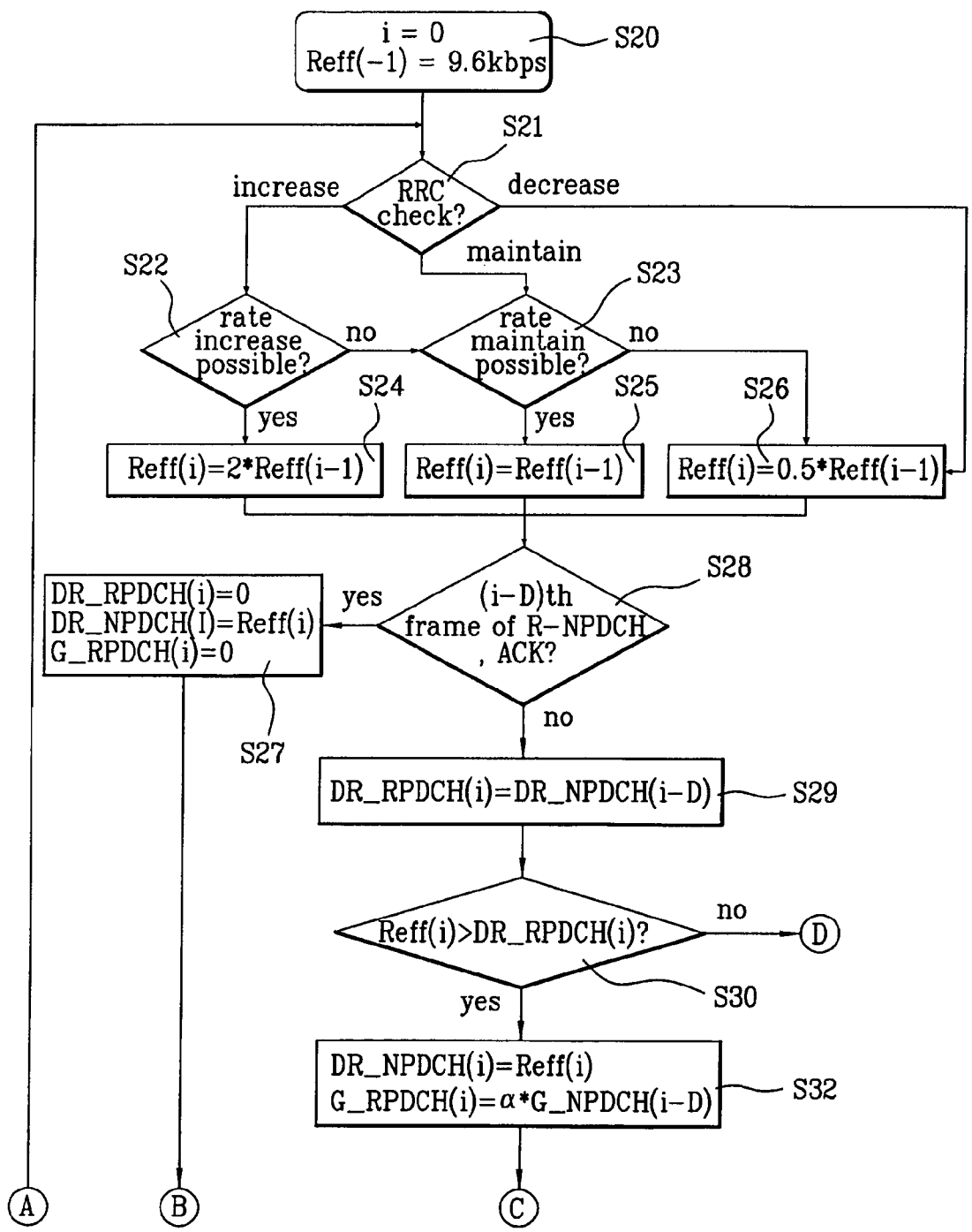
FIG. 12A and, FIG. 12B illustrate flowcharts of another examples for the systems of a reverse link traffic transmission data rate control of a base transceiver system and an energy reduction reverse link automatic retransmission.
Figure 12B:
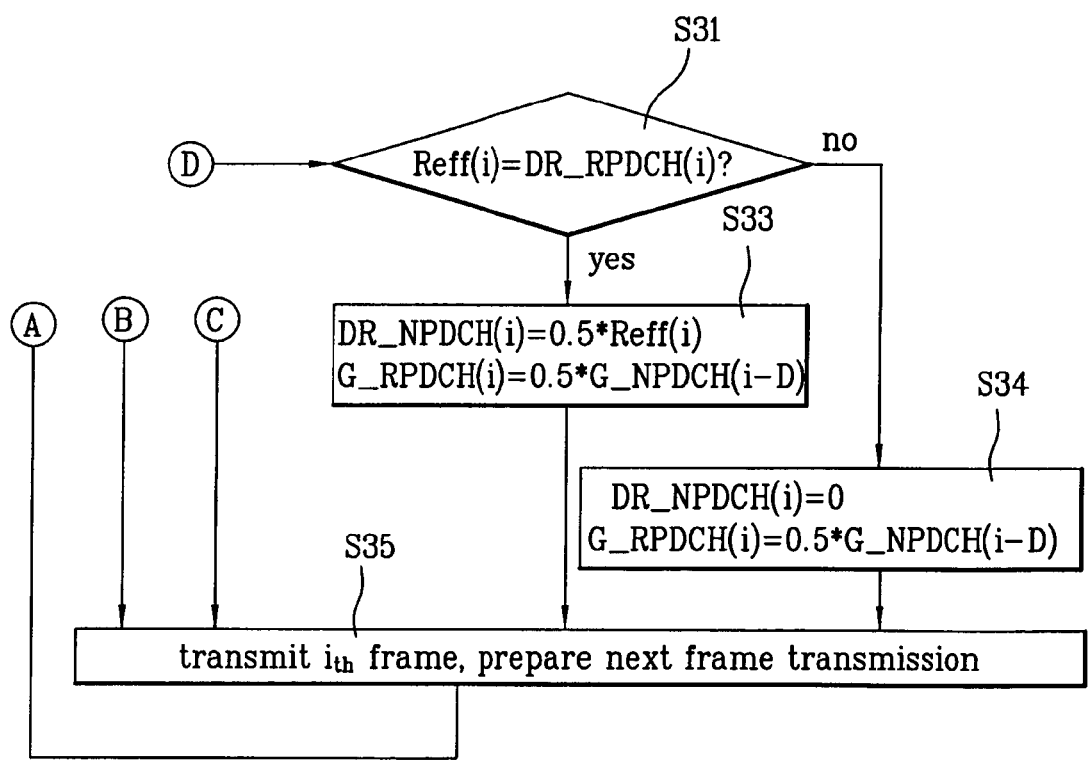

Let us assume, as explained in the foregoing description, that the initial transmission data rate of the packet was R and that the effective data rate determined by the data rate control is R at the time pint of retransmission. When the methods in FIG. 11A and FIG. 11B are used, the terminal comes into use of surplus energy, which is maximum 101 or (1+0.5)=1.7 dB bigger than the energy allowed to the terminal itself, additionally. Considering a margin of 1.7 dB when the base transceiver system generates RRC (reverse rate control) information, the multiplexing method in FIG. 10A and FIG. 10B has no other problem. Yet, such a relatively big margin may have difficulty in precision of the reverse data rate control. In such a case, the flowcharts in FIG. 12A and FIG. 12B may be used instead of using the flowcharts in FIG. 11A and FIG. 11B. FIG. 12A and FIG. 12B illustrate flowcharts of another examples for the systems of a reverse traffic transmission data rate control of a base transceiver system and an energy reduction reverse link automatic retransmission, in which the energy reduction factor .alpha. is 0.5.

Comparing FIG. 11A/FIG. 11B to FIG. 12A/FIG. 12B, when an initial transmission data rate for a packet is R and an effective data rate determined at a time point of retransmission is R, a data rate of R-NPDCH for a packet to be newly transmitted currently is set up as an effective data rate R.sub.eff(i) in FIG. 11A and FIG. 11B. Yet, the data rate of R-NPDCH for the packet to be newly transmitted currently is set up as ½ of the effective data rate R.sub.eff(i) on a step S33 in FIG. 12A and FIG. 12B.

It is noteworthy that there are two kinds of methods when the effective data, rate R.sub.eff(i) is 9600 bps. There exists no half of 9600 bps which is the lowest data rate. Hence, one method is to use 9600 bps as the transmission data rate of R-NPDCH, and the other is to transmit no data to R-NPDCH. In the former method, it is assumed that the additional available energy of 1.7 dB, which is relatively small, is allowable.

Second, the energy and data rate controls using the TDM system are carried out as follows.

When there is a data rate determined in accordance with the reverse dedicate rate control, in order to construct code symbols enabling to fill the length of an interleaving block for the data rate, code symbols for new transmission and retransmission are separated for time-multiplexing, modulation, and diffusion so as to be transmitted.

In such a system, packets for retransmission and new transmission are transmitted through one physical channel using one Walsh codes.

The TDM system can be realized in accordance with the construction in FIG. 2.

First of all, it has to be considered where ACK and NAK commands are managed in order to apply a reverse HARQ system to a management method of the ACK and NAK commands.

Namely, it should be firstly taken into consideration that the ACK and NAK commands are managed by either a base transceiver system (hereinafter abbreviated BTS) or a base station controller (hereinafter abbreviated BSC).

If BSC controls ACK and NAK, all BTSs in an active set comes into transmission of the demodulated packets to ESC. Therefore, BSC generates an ACK signal if there exists at least one good packet or a NAK signal if all the packets transmitted from BTS are bad, so as to transmit such signals to all BTSs in the active set.

Then, all BTSs begin to transmit the same ACK or NAK signals to a terminal. If such a system is used, the terminal enables to carry out a soft combining on the ACK and NAK signals so as to increase the reliance for the ACK and NAK signals. Unfortunately, a performance delay time of HARQ increases as well.

Instead, if BTS directly handles the ACK and, NAK signals, there occurs no delay problem between BSC and BTS. Yet, all BTSs in the active set may generate ACK or NAK signals which are different respectively, whereby the terminal is unable to apply the soft combining to these signals.

When the ACK signal is received from at least one of BTSs in the active set, the retransmission for the corresponding packet fails to occur in the terminal.

Moreover, for the structure of a forward channel to transmit ACK and NACK signals, there are various methods of forming a forward channel to transmit ACK and NACK signals to a terminal. One method is to form one independent physical channel for the transmission of ACK and NAK signals. And, the other method is to use both of the channels for reverse dedicated rate control and the physical channel in common.

First, one independent physical channel is formed to transmit ACK and NAK signals In this case, various users are preferred to be accommodated in one common channel instead of using the respective physical channels for ACK and NAK signals transferred, to the respective terminals.

Moreover, a channel for a dedicate rate control is required. Through this channel, RRC (reverse rate control) information is transferred to the terminals which are transmitting packet data through the current reverse link channel by packet unit. And, it is able to multiplex this channel into one common physical channel with ACK/NAK signals.

Such a multiplexing enables to save Walsh code.

Figure 13:
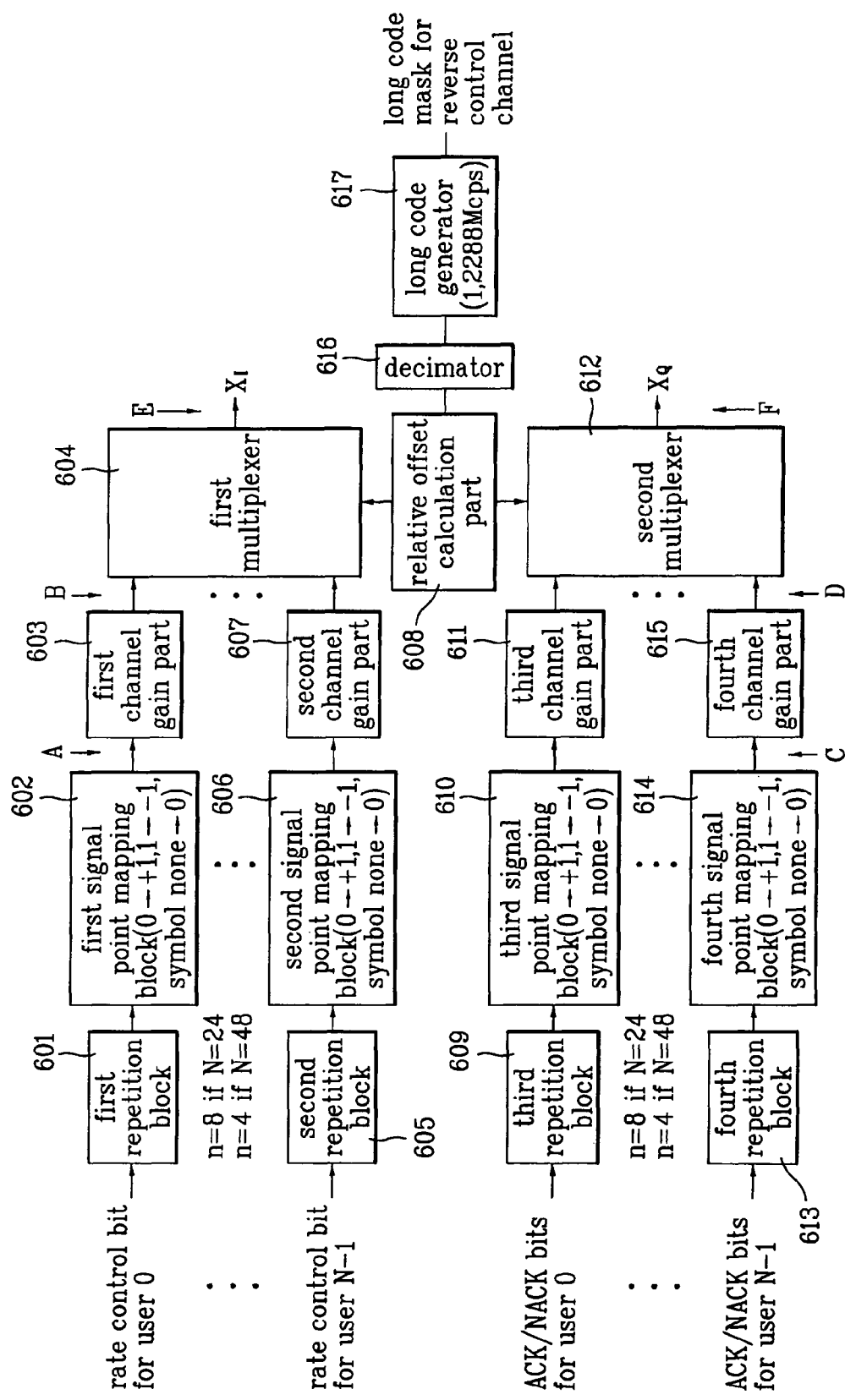
FIG. 13 illustrates a block diagram of a channel for ACK/NACK transmission and a channel multiplexing a reverse rate control channel according to the second embodiment of the present invention.

FIG. 13 illustrates a block diagram of a channel for ACK/NACK transmission and a channel multiplexing a reverse rate control channel according to the second embodiment of the present intention, in which the corresponding channels are multiplexed using one Walsh code.

Referring to FIG. 13, blocks for a reverse common control channel includes repetition blocks 601, 605, 609, and 613, signal point mapping blocks 602, 606, 610, and 614, channel gain parts 603, 607, 611, and 615, multiplexers 604 and 612, a relative offset calculation part 608, a decimator 616, and a long code generator 617.

RRC bits for a reverse data rate control are transmitted to a branch-I and ACK or NACK bits are transmitted to a branch-Q, and vice versa. This above-generated channel will be called F-CRCCH (forward common reverse control channel).

The branch-I and branch-Q define the respective channels having a phase difference, which generally means a vertical phase difference.

Namely, two kinds of sub-channels, F-CRCCH (forward common rate control channel) and F-CACKCH (forward common acknowledgement channel), are multiplexed in one F-CRCCH.

And, F-CRCCH enables accommodate control information for 24 or 48 users.

If 24 users are accommodated, ACK or NACK bits are repeated 8 times. In this case, positions of the repeated bits for more diversity gain are arranged with uniform intervals for total 20 ms packet time. Namely, if one packet is divided into 16 power control groups (PCG), the control information is transmitted once every 2 PCG.

If 48 users are accommodated in one F-CRCCH, the control information is repeated four times and transmitted every 4 PCG.

The repetition blocks 610, 605, 609, and 613 use the ACK/NACK bit or the respective rate control bits for a plurality of users as their inputs, and repeat the bits for the repeated transmission for 20 ms packet time every PCG section.

Each of the signal point mapping blocks 602, 606, 610, and 614 carries out mapping on 0 into +1, 1 into −1, and none (no transmission bit) into 0 among the repeated bit values. It the number of the users is 24, the number of symbols at a point A or point C through the signal point mapping blocks 602, 606, 610, and 614 output one symbol every 2 PCG sections. And, if the number of users is 48, one symbol is outputted every 4 PCG sections.

The channel gain parts 603, 607, 611, and 615 adjust channel gains of the respective bits for the corresponding users. The channel gain parts allocate the different channel gain values for the corresponding users, respectively (point B or point D).

The multiplexers 604 and 612 carry out multiplexing on the rate control bits of the respective users of which gains are adjusted or ACK/NACK bits of the respective users. In this case, the multiplexers 604 and 612 adjust offset values of the respective users in accordance with the offset value provided by the relative offset calculation part 608.

The long code generator 617 generates long codes which are different in accordance with a long code mask for the reverse control channel, and the decimator 616 detects the long codes by chip unit so as to provide the relative calculation part 608 with the detected long codes. Accordingly, the relative offset calculation part 608 calculates the offset values of the respective users so as to provide the multiplexers 604 and 612 with the calculated offset values.

Meanwhile, the reverse channel informing the data rate of the reverse link is generated by the following manners.

R-NPDCH channel is a channel of a variable data rate in which the data rate can vary basically. Hence, a reverse rate indication channel (hereinafter abbreviated RRI channel), which informs the data rate of the current R-NPDCH, exists in the reverse link. In this case, the data rate for R-RPDCH of the present invention is already known to the base transceiver system (BTS), whereby clear indication is unnecessary. In the current reverse transmission, additional information of one bit is necessary for informing whether the transmission of a new packet and, the other transmission of a packet, in which NACK occurs, are multiplexed reciprocally.

Accordingly, the present invention designs the HARQ system effective in the reverse link of the present 1x-EV DV, thereby enabling to increase an effect of data throughput of the reverse link.

Moreover, the present invention enables to design an effective combination of the reverse link dedicated rate control method and the HARQ system, which is enabled by using the HARQ system using Type-II or Type-III using an incremental redundancy system, or the chase combining or partial combining of the Type-I HARQ system.

The HARQ system of the reverse link enables to use the method of reducing the receiving energy of the retransmitted packet down to the energy received at the initial transmission. Such a method can be applied to the transmission for the new using the spare energy space, thereby increasing the throughput of the reverse link.

Third Embodiment

A third embodiment according to the present invention provides a method and apparatus for determining a power level optimized to each sub-packet according to a channel status and/or system state and applying the determined power level to each corresponding sub-packet when transmitted. The channel status or system state may include encoded packet size and whether a power boost mode is utilized.

The total power needed to transmit the packet data is quantized using a traffic-to-pilot power ratio (TPR). The total power needed is determined by considering one packet that is not divided into several sub-packets. The packet is constructed with $N_{SLOT}$ slots.

In the conventional art method, once a TPR is determined for the packet, the determined TPR is uniformly applied to the first through last slots until the packet is completely transmitted. Therefore, all the slots maintain the same TPR. If the traffic-to-pilot power ratio is determined according to transmission rate and coding scheme of the packet as $TPR_{OLD}$, a sum of the traffic-to-pilot power ratios transmitting the packet is expressed by Equation 1.

Total transmission energy=$N_{SLOT}*TPR_{OLD}$ [Equation 1]

The packet may be divided into several sub-packets. Assuming that each of the sub-packets is constructed with the same number of slots, if the number of slots constructing one sub-packet is $N_{SUBSLOT}$ and the number of sub-packets is $N_{SUBPACKET}$, the number $N_{SLOT}$ of slots constructing the packet is expressed by Equation 2.

$N_{SLOT}=N_{SUBSLOT}*N_{SUBPACKET}$ [Equation 2]

In the conventional art method, an identical traffic-to-pilot power ratio, $TPR_{OLD}$, is applied to each sub-packet. The total transmission energy is calculated using $TPR_{OLD}$ as expressed by Equation 3.

Total transmission energy=$N_{SUBSLOT}*N_{SUBPACKET}*TPR_{OLD}$ or Total transmission energy=$N_{SLOT}*TPR_{OLD}$ [Equation 3]

Consequently, Equation 3 indicates that the sum of the traffic-to-pilot power ratios for transmitting the packet is identical even if the packet is divided into several sub-packets.

However, in the present invention, the same TPR is not applied to all the sub-packets. Rather, the TPR is optimized for each sub-packet in accordance with a channel status and/or system state. The optimized TPR determined for a particular sub-packet is applied to transmit that sub-packet.

In accordance with the channel status and/or system state, a higher TPR may be allocated to a front sub-packet and a lower TPR is allocated to a rear sub-packet, or vice-versa. Therefore, a probability of successful transmission of any sub-packet may vary according to whether the higher or lower TPR is used. Furthermore, if various traffic-to-pilot power ratios are applied to the sub-packets formed from a packet, the probability of successful transmission of the packet may vary. Moreover, transmission efficiency may be improved.

The present invention provides a method and apparatus for allocating separate traffic-to-pilot power ratios to sub-packets. It is assumed that a total transmission energy to transmit sub-packets to which the same TPR is allocated, a total transmission energy to transmit one packet without using sub-packets, and a total transmission energy to transmit sub-packets to which separate traffic-to-pilot power ratios are allocated, respectively, are identical.

As expressed by Equation 4, a sum of the traffic-to-pilot power ratios for transmitting one packet without using sub-packets is equal to a sum of the traffic-to-pilot power ratios when the TPR is optimized for each sub-packet.

$T_{TPR}=\Sigma(Slot_i*TPR_i)=N_{SLOT}*TPR_{OLD}$ [Equation 4]

In Equation 4, $T_{TPR}$ is the total transmission energy, $TPR_i$ is the TPR applied to the $i^{th}$ sub-packet and $Slot_i$ is the number of sub-packets constructing one packet.

A rate of the traffic-to-pilot power ratio allocated to each of the sub-packets over the total $T_{TPR}$ can be expressed by Equation 5.

$$\alpha_i = \frac{TPR_i}{T_{TPR}}$$ [Equation 5]

The rate of the traffic-to-pilot power ratio allocated to each of the sub-packets over the total $T_{TPR}$ can be expressed by Equation 6 using a ratio of $TPR_i$ to $TPR_{OLD}$.

$$\beta_i = \frac{TPR_i}{TPR_{old}}$$ [Equation 6]

In accordance with Equations 5 and 6, $TPR_i$ can be indirectly determined using $\alpha_i$ and $\beta_i$ instead of determining $TPR_i$ directly.

For example, when one packet is constructed with sixteen slots ($N_{SLOT}=16$), if a value of $TPR_{OLD}$ determined according to the given transmission rate and coding scheme is '5', a value of $T_{TPR}$ is '5*16=80' assuming one-packet transmission. If the packet is divided into four sub-packets to be transmitted, one packet consists of four sub-packets. If the TPR is identically applied to each of the sub-packets, as in the conventional method, a value of $T_{TPR}$ becomes '5*4+5*4+5*4+5*4=80'. Even if the packet is divided into sub-packets, the value of $T_{TPR}$ remains unchanged.

Figure 14:
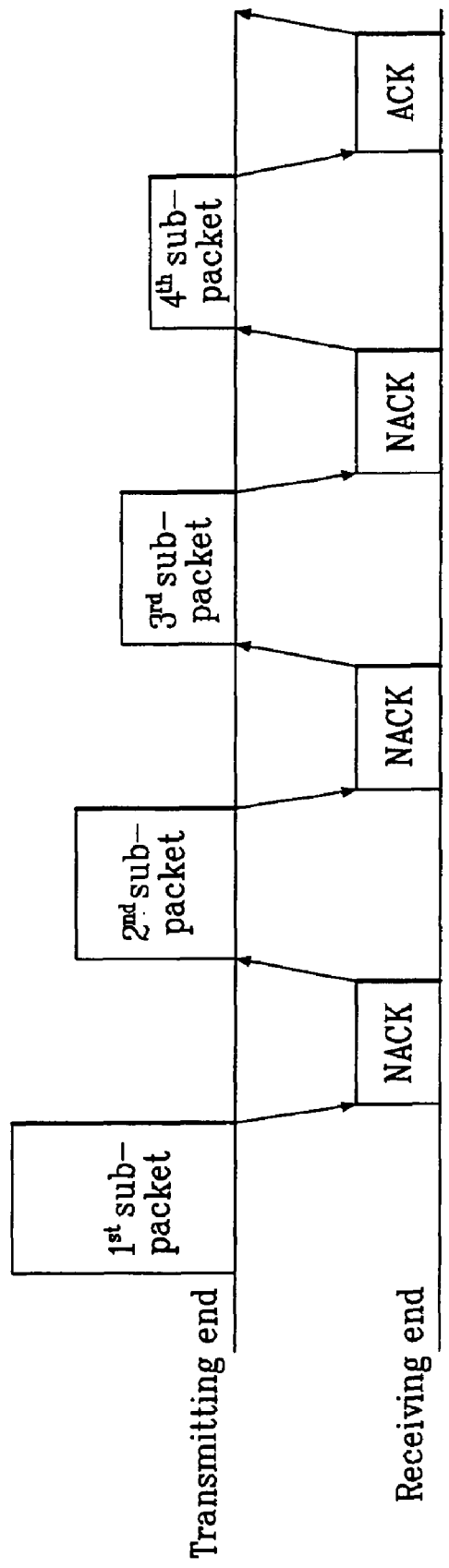
FIG. 14 illustrates a timing diagram of transmission of sub-packets for which separate traffic-to-pilot power ratios are determined according to one embodiment of the present invention.

FIG. 14 illustrates a timing diagram of sub-packet transmission when traffic-to-pilot power ratios are assigned to each sub-packet individually according to one embodiment of the present invention. Referring to FIG. 14, considering a current channel status and system state, it is assumed that performance can be enhanced if more power is allocated to a sub-packet that is transmitted first. Therefore, the highest TPR is applied to the first sub-packet that is transmitted and different traffic-to-pilot power ratios, each relatively lower than that of the first sub-packet, are applied to the following sub-packets.

For example, assume that as a result of calculating optimal traffic-to-pilot power ratios, the determined traffic-to-pilot power ratios applied to a first through fourth sub-packets are $TPR_1=10$, $TPR_2=5$, $TPR_3=3$, and $TPR_4=2$. Therefore, the total sum $T_{TPR}$ of traffic-to-pilot power ratios to be transmitted is '10*4+5*4+3*4+2*4=80'. The total sum of the traffic-to-pilot power ratios may be maintained equal to that of the conventional method applying the identical TPR to each of the sub-packets. If performance is enhanced by allocating more power to the first transmitted sub-packet according to the current channel status and system state, a higher TPR is assigned to the first transmitted sub-packet so that higher transmission efficiency may be achieved even though the same power needed to apply the identical TPR to all the sub-packets is used.

Applying the traffic-to-pilot power ratios from the above example, the first sub-packet illustrated in FIG. 14 is transmitted from a transmitting entity, for example a terminal, to a receiving entity, for example a network. As illustrated in FIG. 14, the receiving entity determines that an error exists in the transmission of the first sub-packet and transmits non-reception acknowledgement response (NACK) to the transmitting entity. Upon receiving the NACK, the transmitting entity applies a TPR to the second sub-packet transmitted which is lower than that applied to the first sub-packet transmitted. The transmission of successive sub-packets at corresponding traffic-to-pilot power ratios is repeated until reception acknowledgement response information (ACK) is received from the receiving entity.

As illustrated in FIG. 14, when the higher TPR is applied to the first transmitted sub-packet rather than applying an identical TPR to each sub-packet, the transmission efficiency can be enhanced. Therefore, effective packet transmission can be accomplished using less power.

The above example may be represented using $\alpha_i$ or $\beta_i$ as defined in Equation 5 and Equation 6, respectively as follows.

$\alpha_1=0.5, \alpha_2=0.25, \alpha_3=0.15, \alpha_4=0.1$ $\beta_1=2, \beta_2=1, \beta_3=0.6, \beta_4=0.4$ It is also possible to transmit each of the sub-packets by determining the above values and calculating a TPR to be applied to each of the sub-packets.

Figure 15:
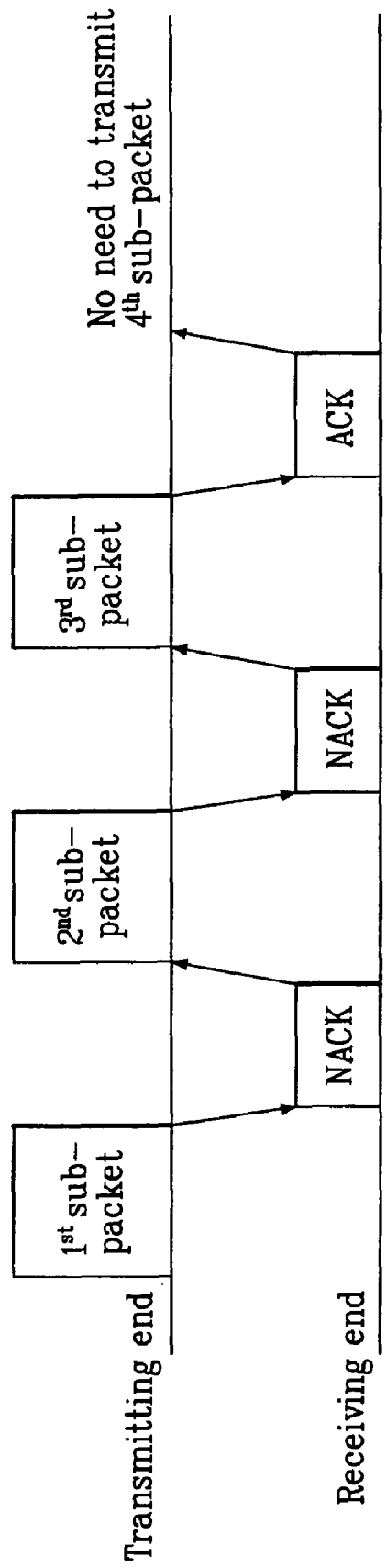
FIG. 15 illustrates a timing diagram of sub-packet transmission by applying the same traffic-to-pilot power ratio to each sub-packet when 'Early Termination' occurs.

It is possible that a value of $T_{TPR}$ applied to the transmission of one whole packet may be different from the sum of traffic-to-pilot power ratios applied to the respective sub-packets. FIG. 15 is a timing diagram illustrating 'Early Termination' when sub-packets are transmitted by applying an identical TPR according to the conventional method.

Referring to FIG. 15, one packet is divided into four sub-packets. An identical TPR is applied to each of the sub-packets to be sequentially transmitted. If the result of combining the first to third sub-packets transmitted is successful decoding of the packet data, it is unnecessary to transmit the fourth sub-packet. Therefore, the packet transmission is successfully accomplished without transmitting one whole packet, which is referred to as the early termination effect.

Figure 16:
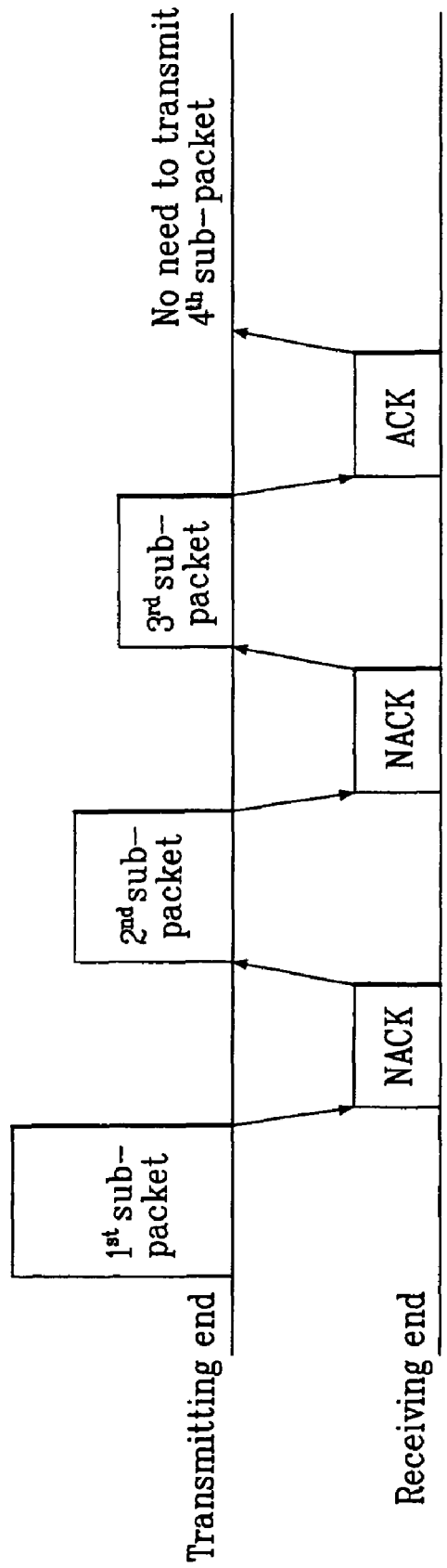
FIG. 16 illustrates a timing diagram of sub-packet transmission when 'Early Termination' occurs according to one embodiment of the present invention.

FIG. 16 is a timing diagram illustrating 'Early Termination' according to the present invention. Referring to FIG. 16, in a channel environment in which throughput is increased by allocating more transmission power to a first transmitted sub-packet, the transmission efficiency may be enhanced by the early termination effect when a higher TPR is allocated to the first transmitted sub-packet.

Figure 17:
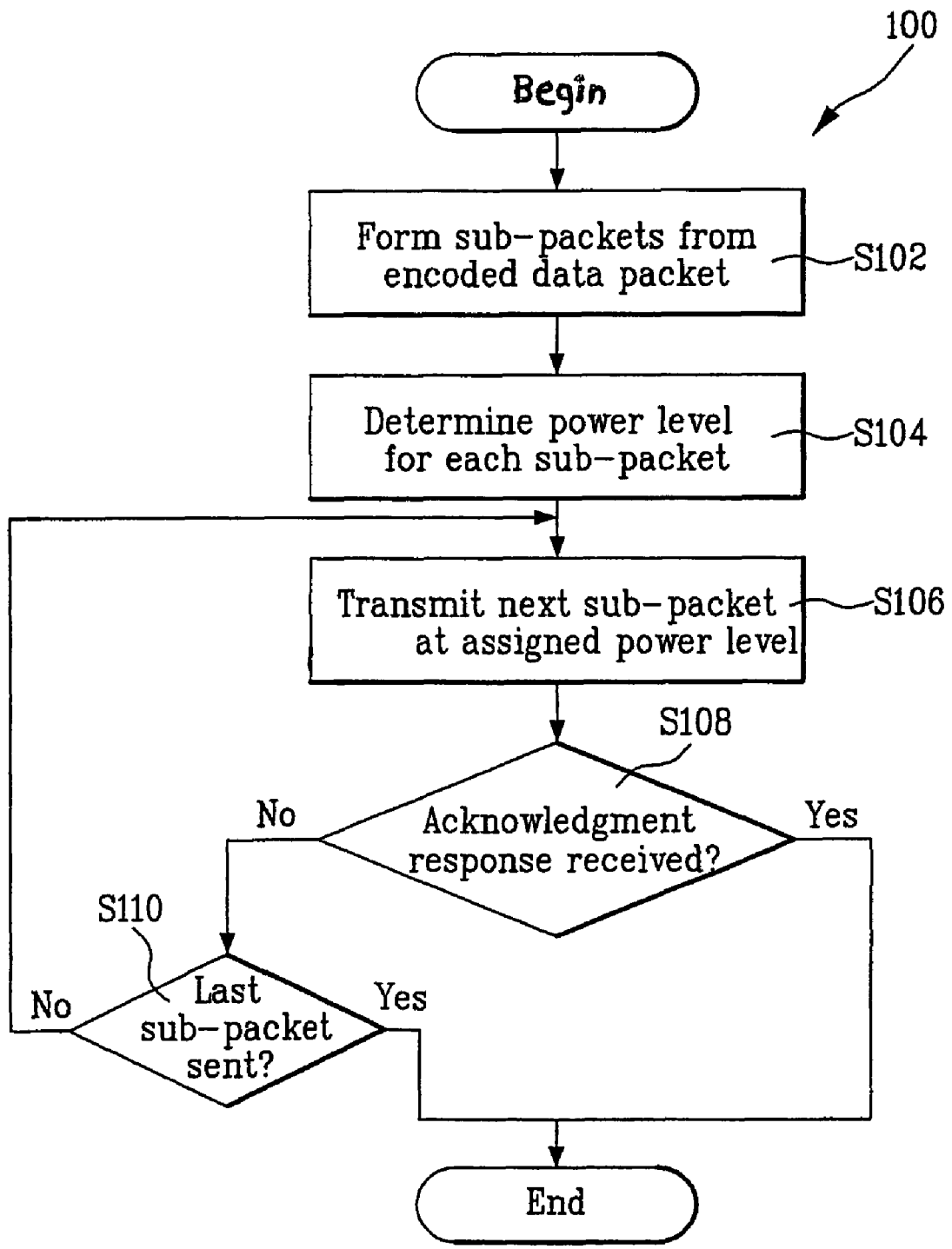
FIG. 17 illustrates a flow chart of a method for transmitting an encoded packet as sub-packets with individually determined power levels according to one embodiment of the present invention.

FIG. 17 illustrates a flow chart of one method 100 of the present invention. The method 100 includes forming sub-packets from an encoded packet of data to be transmitted (S102), determining a power level for each of the sub-packets (S104), transmitting a sub-packet utilizing the determined power level (S106), determining whether an acknowledgment response was received (S108) and transmitting the next sub-packet if an acknowledgment response was not received and not all sub-packets have been transmitted (S110).

In step S102, an encoded data packet to be transmitted from a transmitting entity to a receiving entity is reconfigured into multiple sub-packets. It is contemplated that a predetermined number of sub-packets may be formed.

Each sub-packet includes sufficient information to allow the encoded data packet to be formed if the sub-packet is correctly received and decoded. Therefore, early termination is facilitated once a sub-packet is correctly received and decoded before all sub-packets have been transmitted.

In step S104, a power level is determined for each sub-packet. The power level may be based on a channel state or transmission state, for example a transmission data rate or channel power level associated with the data rate. The transmission data rate may be associated with an encoded packet size.

The power level may be optimized for each sub-packet and is preferably associated with a traffic-to-pilot power ratio. Preferably, the power level assigned to a first sub-packed transmitted is higher than the power levels assigned to sub-packets transmitted later, for example about 3 db higher, and the sum of the power levels assigned to all the sub-packets is substantially equal to a power level associated with the data rate.

Figure 18:
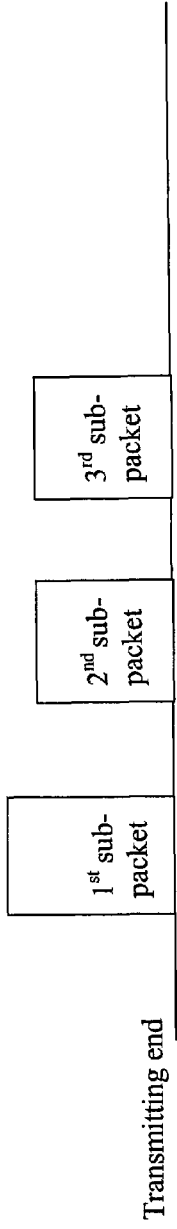
FIG. 18 illustrates a packet of data transmitted as three sub-packets according to one embodiment of the present invention.

In one embodiment, three sub-packets are formed. The power level assigned to the first sub-packet is greater than or equal to the power levels assigned to the second and third sub-packets and the power level assigned to the second sub-packet is greater than or equal to the power level assigned to the third sub-packet. Preferably, the power level assigned to the first sub-packet is greater than the power level assigned to the second and third sub-packets, which are assigned the same power level as illustrated in FIG. 18.

Figure 19:
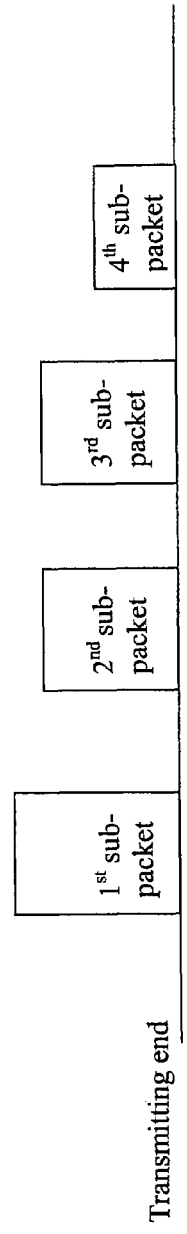
FIG. 19 illustrates a packet of data transmitted as four sub-packets according to one embodiment of the present invention.

In another embodiment, a fourth sub-packet is formed as illustrated in FIG. 19. The fourth sub-packet is assigned a power level less than the power level assigned to the first sub-packet.

Figure 20:
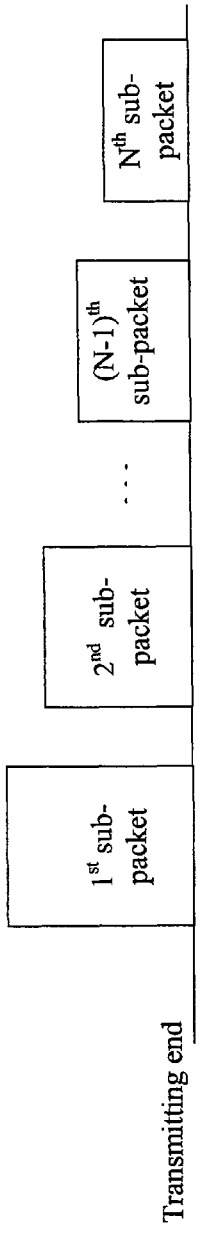
FIG. 20 illustrates a packet of data transmitted as sub-packets having sequentially decreasing power levels according to one embodiment of the present invention.

In yet another embodiment, the first sub-packet is assigned a higher power level than the other sub-packets. Preferably the power levels of the other sub-packets are sequentially less than the previous sub-packet as illustrated in FIG. 20.

In step S106, a sub-packet is transmitted at the assigned power level and, in step S108, it is determined if an acknowledgment response is received indicating that the sub-packet was correctly received.

If the sub-packet was correctly received, no more sub-packets are transmitted. Early termination may occur if all sub-packets have not yet been transmitted.

If the sub-packet was not correctly received, it is determined in step S110 if there are more sub-packets to transmit. If there are more sub-packets to transmit, the next sub-packet is transmitted at the assigned power level in step S106.

Preferably the sub-packets are transmitted in a reverse communication link and the acknowledgment response is received in a forward communication link. The method 100 may be performed with a mobile station as the transmitting entity and a network as the receiving entity or with a network as the transmitting entity and a mobile station as the receiving entity.

Figure 21:
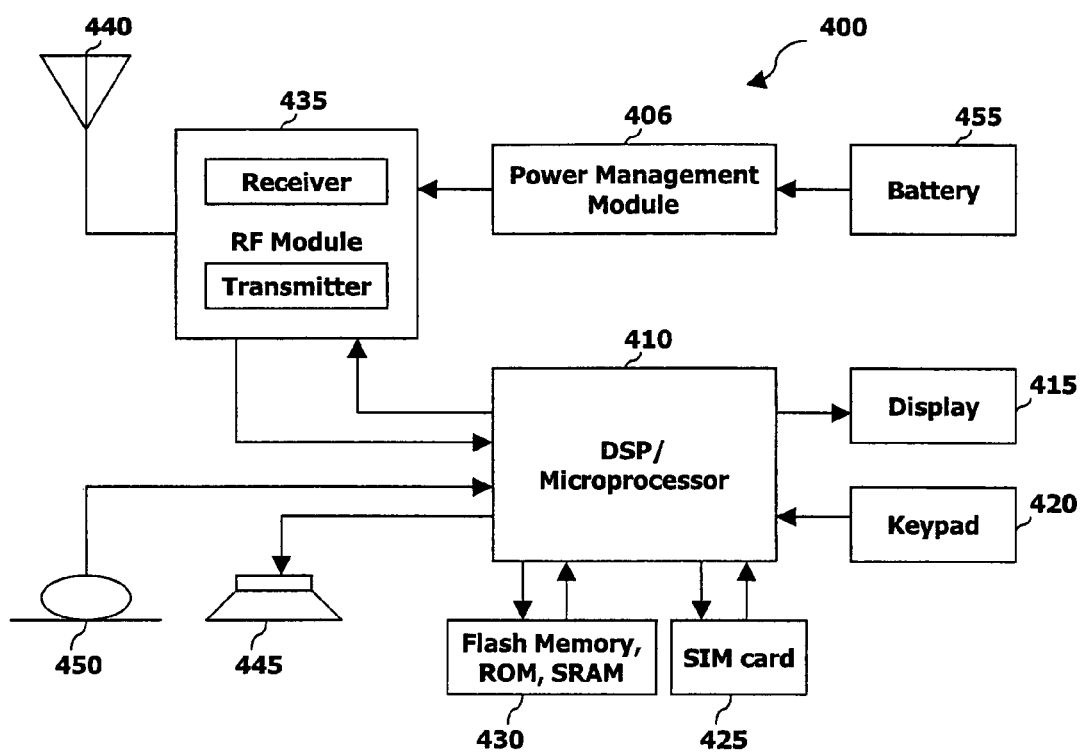
FIG. 21 illustrates a terminal for an encoded packet as sub-packets with individually determined power levels according to one embodiment of the present invention.

FIG. 21 illustrates a block diagram of a terminal 400 according to the preferred embodiment of the present invention. The terminal 400 includes a processor or digital signal processor 410, RF module 435, power management module 406, antenna 440, battery 455, display 415, keypad 420, memory module 430, SIM card 425 (which may be optional), speaker 445 and microphone 450.

A user enters instructional information, such as a telephone number, for example, by pushing the buttons of a keypad 420 or by voice activation using the microphone 450. The processor 410 receives and processes the instructional information to perform the appropriate function, such as to dial the telephone number. Operational data may be retrieved from the Subscriber Identity Module (SIM) card 425 or the memory module 430 to perform the function. Furthermore, the processor 410 may display the instructional and operational information on the display 415 for the user's reference and convenience. Moreover, the processor 410 is adapted to perform the methods of the present invention.

The processor 410 issues instructional information to the RF module 435, to initiate communication, for example, transmit radio signals comprising voice communication data or transmit sub-packets as described herein. The RF module 435 comprises a receiver and a transmitter to receive and transmit radio signals. An antenna 440 facilitates the transmission and reception of radio signals. Upon receiving radio signals such as an acknowledgment response from the network as described herein, the RF module 435 may forward and convert the signals to baseband frequency for processing by the processor 410. The processed signals may also be transformed into audible or readable information outputted via the speaker 445, for example if the radio signals are an incoming phone call.

Figure 22:
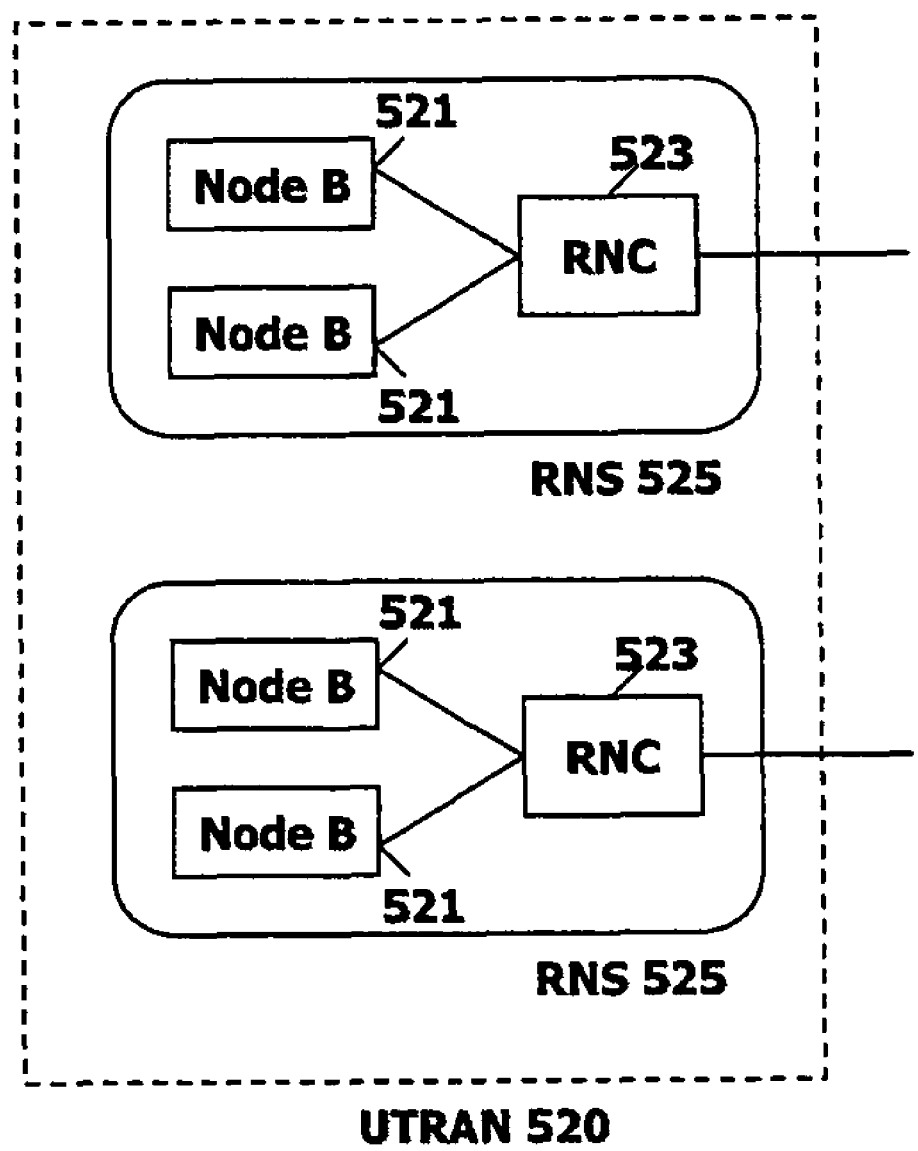
FIG. 22 illustrates a network for transmitting an encoded packet as sub-packets with individually determined power levels according to one embodiment of the present invention.

FIG. 22 illustrates a block diagram of a UTRAN 520 according to the preferred embodiment of the present invention. The UTRAN 520 includes one or more radio network sub-systems (RNS) 525. Each RNS 525 includes a radio network controller (RNC) 523 and a plurality of Node-Bs (base stations) 521 managed by the RNC. The RNC 523 handles the assignment and management of radio resources and operates as an access point with respect to the core network 30. Furthermore, the RNC 523 is adapted to perform the methods of the present invention.

The Node-Bs 521 receive information sent by the physical layer of the terminal 410 through an uplink, and transmit data to the terminal through a downlink. The Node-Bs 521 operate as access points, or as a transmitter and receiver, of the UTRAN 520 for the terminal 410.

The third embodiment of the present invention is advantageous when transmitting one packet constructed with sub-packets. The time diversity effect can be achieved since packet data is less sensitive to delay and performance is enhanced relative to transmission of one whole packet.

If the early termination effect occurs, one packet is received without transmitting all the sub-packets. For example, when one packet is constructed with four sub-packets, it may require transmitting only two or three sub-packets to complete the packet transmission. Therefore, the power used by the present invention is reduced by $\frac{1}{2} \sim \frac{1}{4}$ over the power needed to transmit one whole packet that is not divided into sub-packets.

It will be apparent to one skilled in the art that the preferred embodiments of the present invention can be readily implemented using, for example, the processor 410 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of transmitting a data packet in a wireless communication system, the method comprising:
   transmitting an initial data packet to a receiving device in accordance with a first traffic-to-pilot power ratio (TPR) value; and
   transmitting a retransmission data packet associated with the initial data packet to the receiving device if a non-acknowledgement (NACK) signal is received from the receiving device in response to the initial data packet, wherein the retransmission data packet is transmitted in accordance with a second TPR, and wherein the first TPR value corresponding to the initial data packet is greater than the second TPR value corresponding to the retransmission data packet, and wherein a ratio of the first TPR value to the second TPR value is a predetermined value.

2. The method of claim 1, wherein the initial and retransmission data packets are encoded.

3. The method of claim 1, wherein the initial data packet and the retransmission data packets are transmitted over a reverse communication link, and wherein the NACK signal is received over a forward communication link.

4. The method of claim 1, wherein the predetermined value is any one of 0.5, 0.25, and 0.125.

5. The method of claim 1, further comprising transmitting a new packet to the receiving side.

6. A transmitter for transmitting data packets in a wireless communication system, the transmitter adapted to:
   transmit an initial data packet to a receiving device in accordance with a first traffic-to-pilot power ratio (TPR) value; and
   transmit a retransmission data packet associated with the initial data packet to the receiving device if a non-acknowledgement (NACK) signal is received from the receiving device in response to the initial data packet, wherein the retransmission data packet is transmitted in accordance with a second TPR, and wherein the first TPR value corresponding to the initial data packet is greater than the second TPR value corresponding to the retransmission data packet, and wherein a ratio of the first TPR value to the second TPR value is a predetermined value.

7. The transmitter of claim 6, wherein the initial and retransmission data packets are encoded.

8. The transmitter of claim 6, wherein the initial data packet and the retransmission data packets are transmitted over a reverse communication link, and wherein the NACK signal is received over a forward communication link.

9. The transmitter of claim 6, wherein the predetermined value is any one of 0.5, 0.25, and 0.125.

* * * * *